US012573754B1

(12) United States Patent
Veysoglu et al.

(10) Patent No.: US 12,573,754 B1
(45) **Date of Patent: *Mar. 10, 2026**

(54) ANTENNA MODULE WITH FEED ELEMENTS ON A TRIANGULAR LATTICE FOR ANTENNA ARRAYS

(71) Applicant: Amazon Technologies, Inc., Seattle, WA (US)

(72) Inventors: Murat Veysoglu, Kirkland, WA (US); Ming-Chun Paul Lee, Kirkland, WA (US); Peter James Hetzel, Seattle, WA (US); Christopher Steven Merola, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

This patent is subject to a terminal disclaimer.

(21) Appl. No.: 18/119,090

(22) Filed: Mar. 8, 2023

Related U.S. Application Data

(62) Division of application No. 16/876,904, filed on May 18, 2020, now Pat. No. 11,664,593.

(51) Int. Cl.
*H01Q 5/35* (2015.01)
*H01Q 21/06* (2006.01)

(52) U.S. Cl.
CPC ............. *H01Q 5/35* (2015.01); *H01Q 21/064* (2013.01); *H01Q 21/065* (2013.01)

(58) Field of Classification Search
CPC ....... H01Q 5/35; H01Q 21/064; H01Q 21/065
See application file for complete search history.

(56) References Cited

U.S. PATENT DOCUMENTS

| | | | |
|---|---|---|---|
| 11,211,702 B1 | 12/2021 | Mahanfar | |
| 11,664,593 B1 * | 5/2023 | Veysoglu | H01Q 21/065 343/702 |
| 2007/0052592 A1 | 3/2007 | Purden | |
| 2013/0252603 A1 * | 9/2013 | Immonen | H04W 8/24 455/422.1 |
| 2014/0184457 A1 | 7/2014 | Lea | |

(Continued)

FOREIGN PATENT DOCUMENTS

CN 106848552 A 6/2017

OTHER PUBLICATIONS

Luca, "Wideband Multilayer WAIM Design and Optimization" The 8th European Conference on Antennas and Propagation (EuCAP 2014), p. 2997-3000 (Year 2014).

*Primary Examiner* — Dieu Hien T Duong
(74) *Attorney, Agent, or Firm* — Kilpatrick Townsend & Stockton LLP

(57) ABSTRACT

Technologies directed to arranging antenna elements in a triangular pattern on an antenna module of a phased array antenna are described. The phased array antenna includes a support structure and a first antenna module coupled to the support structure. The first antenna module element has a rectangular shape and includes a first set of antenna elements arranged as a first row and a second row within the rectangular shape. An antenna element of the first row and two antenna elements of the second row form a triangular pattern. Two adjacent antenna elements of the first set of antenna elements are separated by a first distance. Each antenna element of the first set of antenna elements has a first size that is less than half of the first distance.

20 Claims, 25 Drawing Sheets

(56) References Cited

U.S. PATENT DOCUMENTS

| | | | |
|---|---|---|---|
| 2017/0054221 | A1 | 2/2017 | West |
| 2018/0351262 | A1 | 12/2018 | Yoon |
| 2020/0176863 | A1 | 6/2020 | Luna et al. |
| 2021/0058800 | A1 | 2/2021 | Cheon |
| 2021/0305717 | A1 | 9/2021 | Hou |

* cited by examiner

*12 element antenna module*

10 element antenna module

340

640

840

ANTENNA MODULE WITH FEED ELEMENTS ON A TRIANGULAR LATTICE FOR ANTENNA ARRAYS

RELATED APPLICATION

This application is a divisional application of U.S. patent application Ser. No. 16/876,904, filed on May 18, 2020, the entire contents of which are hereby incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
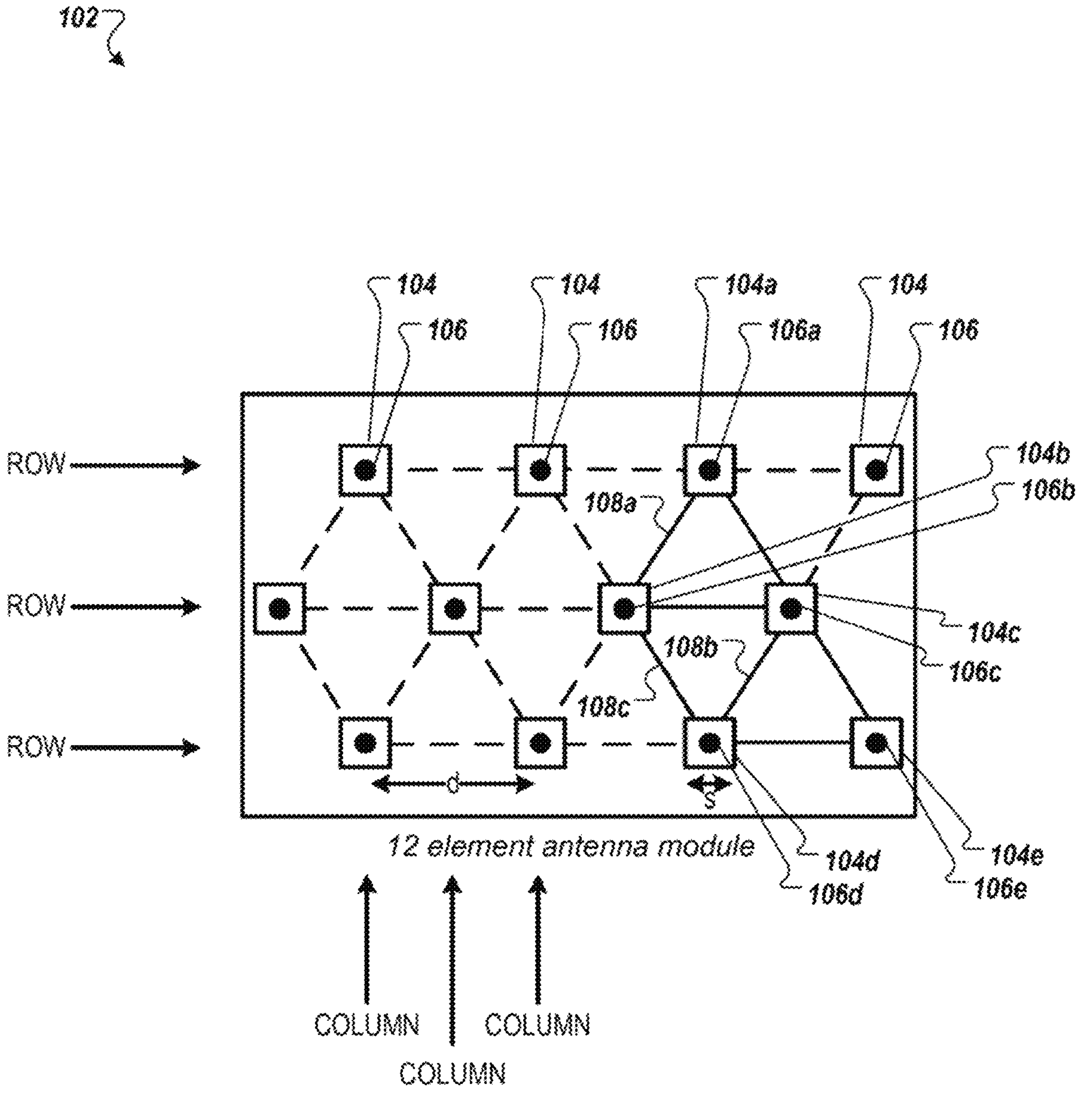
FIG. 1A is a schematic diagram of an antenna module of a phased array antenna structure according to one embodiment.

Technologies directed to antenna element arrangements within a module for an array antenna are described. An array antenna, such as a phased array antenna, can include hundreds or thousands of antenna elements. Described herein are arrangements for antenna elements of antenna modules for applications in large array antennas, such as a phased array antenna. The array antenna can be made up of antenna modules, or simply modules, that include a subset of antenna elements with the subset containing one to tens of antenna elements. The modules can be individually manufactured and assembled as an array antenna. For several reasons including manufacturability and ease of assembly, array antennas in microwave and lower millimeter wave (mm-Wave) are built upon or are supported by Printed Wiring Boards (PWBs) or Printed Circuit Boards (PCBs), where the RF interconnects and possibly also the antenna elements are realized. In general, a PWB is similar to a PCB, but without any components installed on it. Tight manufacturing tolerances are needed for microwave antennas, and the larger the board, the more difficult the board is to manufacture while maintaining those tolerances. The antenna modules can be manufactured using one of several techniques, including Organic substrate PWB and Low Temperature Cofired Ceramic (LTCC) circuit. The subset of antenna elements is referred to as an antenna module or a module. The large array antenna can be made up of an array of antenna modules that are attached to another substrate, such as a PWB, for interconnection with a microwave source. Each antenna module thus incorporates an integer number of antenna elements. The antenna modules are often very closely spaced between each other, preventing the insertion of any other component between them.

A conventional array antenna includes antenna elements arranged on a regular square lattice. The conventional array antenna operates to form beams (e.g., of electromagnetic radiation) and steer the beams by relying on constructive and destructive interference of electromagnetic waves transmitted by each individual antenna element. When the beam is formed by the conventional array antenna with antenna elements arranged on the square lattice, the beam can have grating lobes, which are undesirable for performance. To form a beam the conventional array antenna requires a large number of antenna elements, while the complexity of an array antenna increased with the number of antenna elements.

Aspects of the present disclosure overcome the deficiencies of conventional array antennas by providing an array antenna elements arranged on a triangular lattice. A feed point (such as an antenna feed element) is associated with each antenna element. In order to arrange the antenna elements on a triangular lattice, the feed points can be used as a reference. In other words, the feed points can be placed at each location of a triangular lattice. Arranging antenna elements on a triangular lattice improves performance by removing or reducing the grating lobes and simplifies the array antenna architecture by reducing the number of antenna elements that are required. Reducing the number of antenna elements reduces complexity, cost, mass, and power consumption (or power requirements) of the array antenna. Aspects of the present disclosure can use rectangular antenna modules that are identical to facilitate manufacturing, assembly, and part management. The array antenna is constructed using the antenna rectangular antenna modules. The antenna modules can be manufactured from a ceramic-based material, a Teflon-based material, organic materials, or the like. The antenna elements can be printed on the modules (e.g., using copper). The antenna elements should be printed on the antenna modules in such a way to minimize the space between an edge of the antenna module and one of the antenna elements near the edge. In this way, the antenna elements can be spaced closer together when the antenna modules are assembled together, and the grading lobes can be minimized.

FIG. 1A is a schematic diagram of an antenna module 102 of a phased array antenna structure according to one embodiment. A phased array antenna structure, such as the phased array antenna structure 100 described with respect to FIG. 1D, can be constructed of a set of antenna modules 102 such as antenna module 102. In one embodiment, the antenna module 102 is coupled to a support structure (not shown in FIG. 1A) of the phased array antenna structure. The phased array antenna structure includes a radio frequency (RF) circuit (e.g., an RF module). Radio frequency front-end (RFFE) is coupled to the RF circuit. The phased array antenna structure further includes a circuit board. In one embodiment, the antenna module 102 is electrically and physically coupled to the circuit board. The antenna module 102 has a rectangular shape and includes a set (e.g., of twelve) antenna elements 104 that are disposed in a triangular arrangement within the rectangular shape. Two adjacent antenna elements 104 of the set of antenna elements are separated by a first distance (d). The first distance can be measured between the centers of any two adjacent antenna elements 104. Each antenna element 104 is associated with a feed point 106. An antenna feed (not shown in FIG. 1A) can be coupled to the feed point 106 to feed a signal to the antenna element. As depicted in FIG. 1A, the feed point 106 is located at the center of the antenna element 104. Alternatively, the feed point 106 can be located at other positions of the antenna element 104.

Within the rectangular shape, the first set of antenna elements are organized in a grid of rows and columns. At least one of the multiple rows is offset from at least two of the other rows by a percentage of the first distance. The percentage can be less than twenty-five percent (25%). In one embodiment, the set of antenna elements 104 are organized as a first row, a second row, and a third row of antenna elements. A direction of the offset is along the at least one of the multiple rows. In other words, the offset is in a direction which is parallel to a row and perpendicular to a column in FIG. 1A. The offset affects the distance between the vertical edge of the support structure and each antenna element of the row that is offset.

In one embodiment, the triangular arrangement of the antenna elements 104 is part of a rhombic lattice (e.g., an isosceles triangular lattice), a hexagonal lattice, an equilateral triangular lattice, or a parallelogrammic lattice (e.g., a scalene triangular lattice). Alternatively, the antenna elements 104 are part of other non-square or non-rectangular lattices. The second row of antenna elements 104 is offset from the first row and the third row of antenna elements 104. In other words, the second row can be shifted with respect to the first row and the third row while maintaining a same distance between the first row and the second row and the second row and the third row. The second row is offset from the first row and the third row such that a first feed point 106*a* of a first antenna element 104*a* of the first row, a second feed point 106*b* of a second antenna element 104*b* of the second row, and a third feed point 106*c* of a third antenna element 104*c* of the second row form a first equilateral triangle 108*a*. In other words, the first feed point 106*a*, the second feed point 106*b*, and the third feed point 106*c* are located at the vertices of the first equilateral triangle 108*a*. Additionally, the third feed point 106*c*, a fourth feed point 106*d* of a fourth antenna element 104*d* of the third row, and a fifth feed point 106*e* of a fifth antenna element 104*e* of the third row form a second equilateral triangle 108*b* with the same dimensions as the first equilateral triangle 108*a*. In other words, the third feed point 106*c*, the fourth feed point 106*d*, and the fifth feed point 106*e* are located at the vertices of the second equilateral triangle 108*b*. Further, the second feed point 106*b*, the third feed point 106*c*, and the fourth feed point 106*d* form a third equilateral triangle 108*c* with the same dimensions as the first equilateral triangle 108*a*, but inverted with respect to the first equilateral triangle 108*a*. In other words, the second feed point 106*b*, the third feed point 106*c*, and the fourth feed point 106*d* are located at the vertices of the third equilateral triangle 108*c*. It should be noted that any three mutually adjacent feed points 106 within the antenna module 102 are located to form an equilateral triangle with the same dimensions as the first equilateral triangle 108*a*. An equilateral triangle can also be referred to as an equidistant triangle. Each feed point 106 of the antenna elements 104 are part of a triangular lattice pattern of feed points of the phased array antenna structure. In one embodiment, the triangular lattice pattern is formed by each feed point 106 of each antenna element 104 of the phased array antenna structure and the triangular lattice pattern includes a set of identical equilateral triangles arranged in a uniformly repeating pattern. It should be noted three mutually adjacent feed points 106 refers to a set of three feed points 106 in which each feed point of the set is an adjacent neighbor to each other feed point of the set.

In one embodiment, the triangular lattice pattern is a two-dimensional Bravais lattice that is formed by two vectors (e.g., primitive vectors of a triangular lattice) of identical length with a mutual angle of separation of 120 degrees. In another embodiment, the triangular lattice pattern is a two-dimensional Bravais lattice that is formed by two vectors of identical length with a mutual angle of separation of 60 degrees. In either case, each end of each vector represents a lattice point (e.g., a vertex). In one embodiment, feed points 106 of the antenna elements 104 are located at a lattice point in a triangular lattice. The triangular lattice includes a set of lattice points (e.g., vertices). Three mutually adjacent lattice points form an equilateral triangle. In other embodiments, the feed points can be offset from the lattice points.

The antenna element 104 can be a patch antenna, a micro-strip antenna, a planar inverted-F antenna, a monopole antenna, a dipole antenna, or the like. The antenna element 104 can be a planar element or an antenna element with a ground plane. The feed point 106 can be located at different positions of the antenna element 104 and can be oriented in specific directions.

Although depicted in FIG. 1A as having twelve antenna elements 104 and twelve feed points 106, in other embodiments, the antenna module 102 can have a different number of elements, such as eight, nine, fifteen, eighteen, or another integer number. Further, although the antenna module 102 is depicted as having three rows within the rectangular shape, in other embodiments, the antenna module 102 can have one, two, four, five, or other integer number of rows. Further, although the antenna module 102 is depicted as having four columns within the rectangular shape, in other embodiments, the antenna module 102 can have one, two, four, five, or other integer number of columns.

Figure 1B:
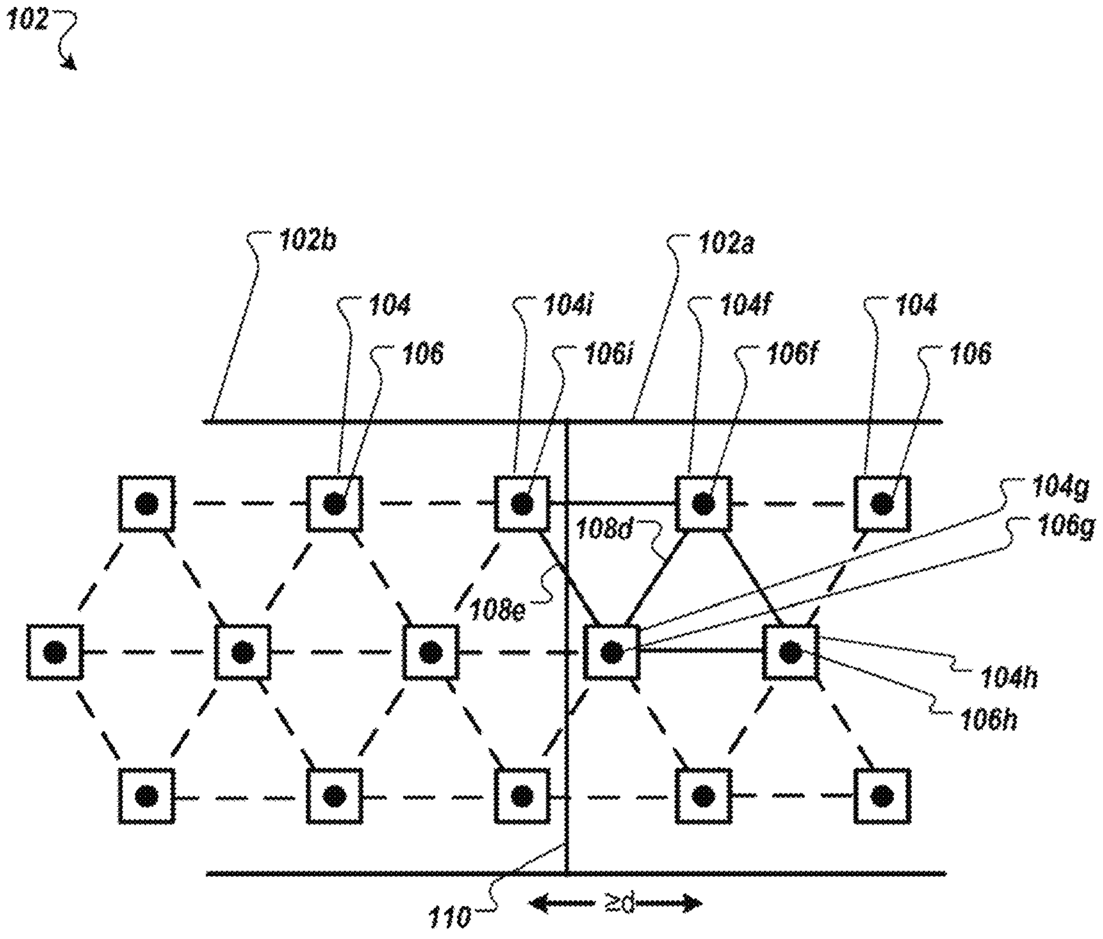
FIG. 1B is a schematic diagram of a first antenna module and a second antenna module of a phased array antenna structure according to one embodiment.

FIG. 1B is a schematic diagram of a first antenna module 102*a* and a second antenna module 102*b* of a phased array antenna structure according to one embodiment. The first antenna module 102*a* and the second antenna module 102*b* are the same as the antenna module 102 of FIG. 1A. The first antenna module 102*a* and the second antenna module 102*b* are identical, except for their position on the phased array antenna structure. As depicted, the first antenna module 102*a* is adjacent to (e.g., to the right of) the second antenna module 102*b* (which is to the left of the first antenna module 102*a*). Alternatively, the first antenna module 102*a* can be adjacent to (e.g., to the left of) the second antenna module 102*b* (which can be to the right of the first antenna module 102*a*). The first antenna module 102*a* and the second antenna module 102*b* share an edge 110.

In one embodiment, the first antenna module 102*a* and the second antenna module 102*b* are coupled to a support structure (not shown in FIG. 1B) of a phased array antenna structure. A first feed point 106*f* of a first antenna element 104*f* of the first antenna module 102*a* is separated from a first feed point 106*i* of a first antenna element 104*i* of the second antenna module 102*b* by at least the first distance (d). This can result from manufacturing limitations for printing or manufacturing an antenna element such that an edge of the antenna element is exactly coincident with an edge of the antenna module.

In a further embodiment, a first row of antenna elements 104 of the second antenna module 102*b* is aligned with a first row of antenna elements 104 of the first antenna module 102*a*, a second row of antenna elements 104 of the second antenna module 102*b* is aligned with a second row of antenna elements 104 of the first antenna module 102*a*, and a third row of antenna elements 104 of the second antenna module 102*b* is aligned with a third row of antenna elements 104 of the first antenna module 102*a*. The first feed point 106*f* of the first row of the first antenna module 102*a*, a second feed point 106*g* of the second row of the first antenna module 102*a*, and a third feed point 106*h* of the third row of the first antenna module 102*a* are located to form a first equilateral triangle 108*d*. Further, the first feed point 106*f*, the second feed point 106*g*, and the first feed point 106*i* of the first row of the second antenna module 102*b* are located to form a second equilateral triangle 108*e* with the same dimensions as the first equilateral triangle 108*d*, but inverted with respect to the first equilateral triangle 108*d*. It should be noted that any three mutually adjacent feed points 106 within the first antenna module 102*a* and the second antenna module 102*b* are located to form an equilateral triangle with the same dimensions as the first equilateral triangle 108*d*. Each feed point 106 of the antenna elements 104 are part of a triangular lattice pattern of feed points of the phased array antenna structure. As described herein, the triangular lattice pattern can be formed with a set of identical equilateral triangles arranged in a uniformly repeating pattern, as a two-dimensional Bravais lattice with different angles of separation.

Figure 1C:
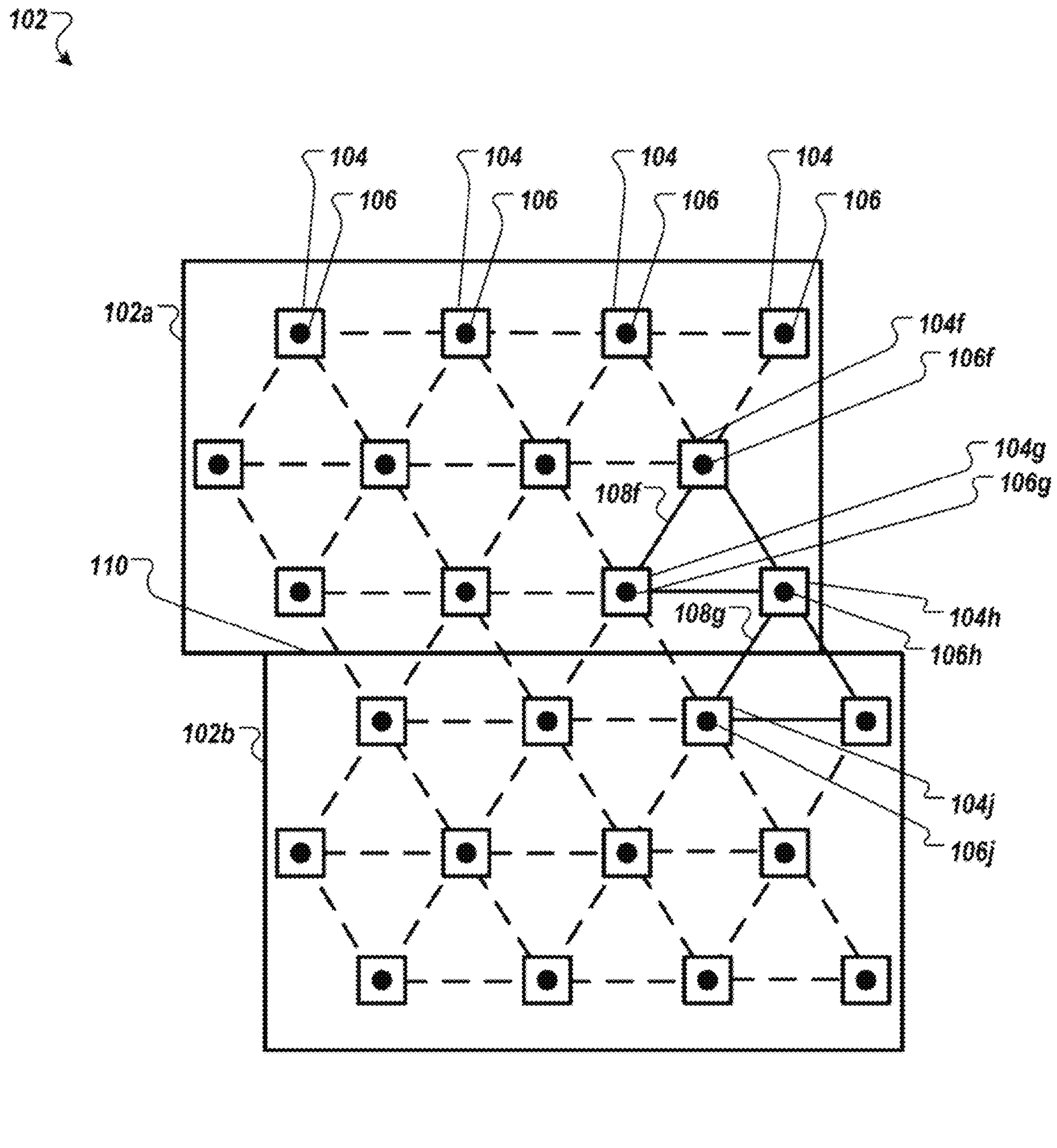
FIG. 1C is a schematic diagram of a first antenna module and a second antenna module of a phased array antenna structure according to one embodiment.

FIG. 1C is a schematic diagram of a first antenna module 102*a* and a second antenna module 102*b* of a phased array antenna structure according to one embodiment. The first antenna module 102*a* and the second antenna module 102*b* are the same as the antenna module 102 of FIG. 1A. The first antenna module 102*a* and the second antenna module 102*b* are identical, except for their position on the phased array antenna structure. As depicted, the first antenna module 102*a* is adjacent to (e.g., to the above) the second antenna module 102*b* (which is below the first antenna module 102*a*). Alternatively, the first antenna module 102*a* can be adjacent to (e.g., to the below) the second antenna module 102*b* (which can be above the first antenna module 102*a*). The first antenna module 102*a* and the second antenna module 102*b* share an edge 110.

In one embodiment, a first feed point 106*f* of the second row of the first antenna module 102*a*, a second feed point

106*g* of the third row of the first antenna module 102*a*, and a third feed point 106*h* of the third row of the first antenna module 102*a* are located to form a first equilateral triangle 108*f*. Further, the second feed point 106*g*, the third feed point 106*h*, and a fourth feed point 106*j* of the first row of the second antenna module 102*b* are located to form a second equilateral triangle 108*g* with the same dimensions as the first equilateral triangle 108*f*, but inverted with respect to the first equilateral triangle 108*f*. It should be noted that any three mutually adjacent feed points 106 within the first antenna module 102*a* and the second antenna module 102*b* are located to form an equilateral triangle with the same dimensions as the first equilateral triangle 108*f*. Each feed point 106 of the antenna elements 104 are part of a triangular lattice pattern of feed points of the phased array antenna structure. As described herein, the triangular lattice pattern can be formed with a set of identical equilateral triangles arranged in a uniformly repeating pattern, as a two-dimensional Bravais lattice with different angles of separation.

Figure 1D:
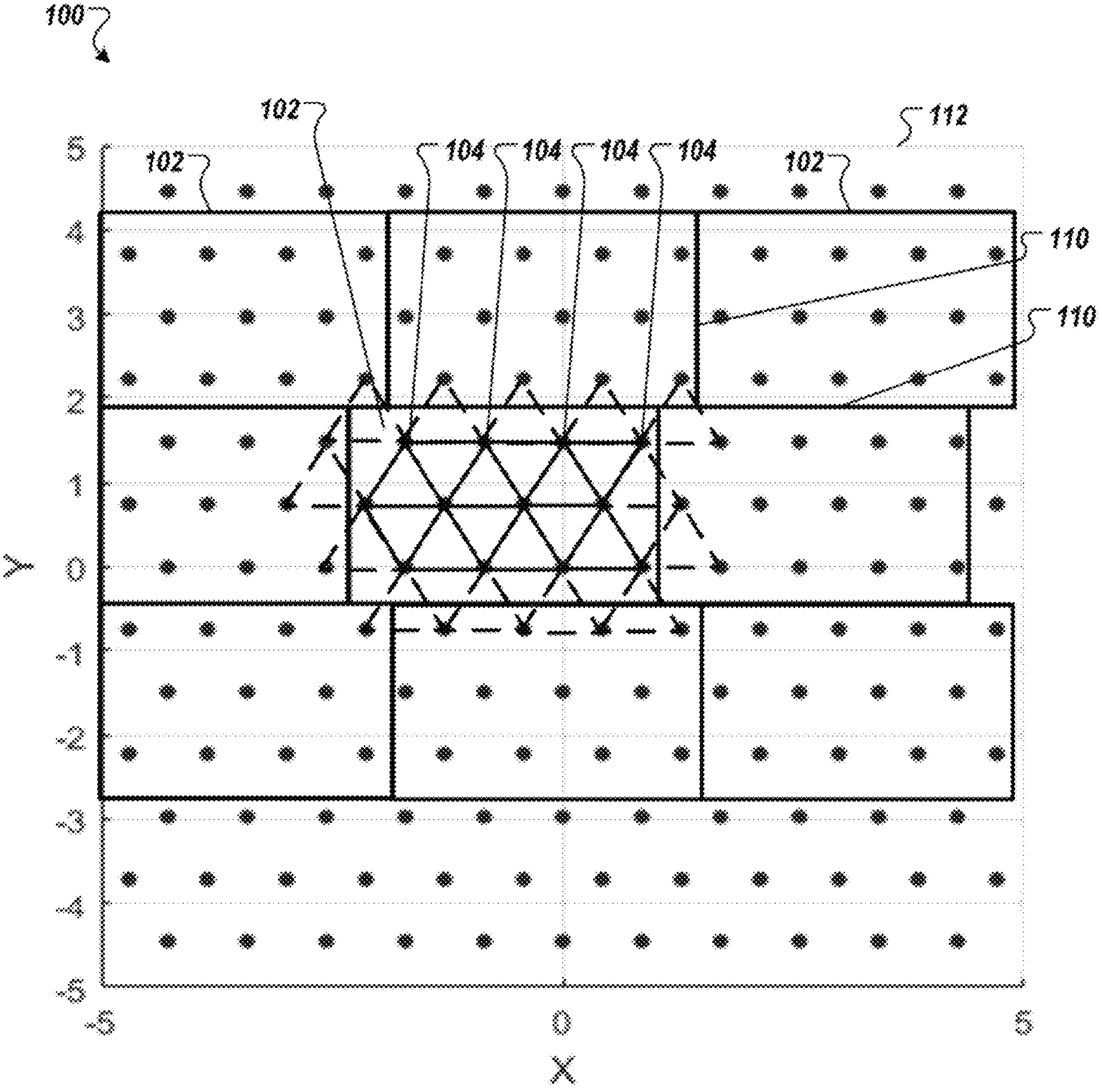
FIG. 1D is a schematic diagram of a phased array antenna structure constructed from antenna modules according to one embodiment.

FIG. 1D is a schematic diagram of a phased array antenna structure 100 constructed from antenna modules 102 according to one embodiment. Although not all components of the antenna modules 102 are shown, the antenna modules 102 are the same or similar to the antenna modules 102 of FIGS. 1A-1C. In particular and for simplicity, the points represent the antenna elements 104, and the feed points 106 are not shown in FIG. 1D. The phased array antenna structure 100 includes a support structure 112. A first antenna module 104 is coupled to the support structure 112. As described with respect to FIGS. 1A-1C, the first antenna module 102 has a rectangle shape and a set of antenna elements 104 disposed in a triangular arrangement within the rectangle shape. In one embodiment, the set of antenna elements 104 are disposed on the first antenna module 102. Any two adjacent antenna elements 104 within the first antenna module 102 are spaced by the first distance (d). Each antenna element 102 has a first size(s) that is less than or approximately equal to half of the first distance. Additionally, a second antenna module 102 that is identical to the first antenna module 102 is coupled to the support structure 112 and is adjacent to the first antenna module 102. An antenna element 104 of the first antenna module 102 is adjacent to and separated by at least the first distance from an antenna element 104 of the second antenna module 102. The phased array antenna structure 100 includes a set of antenna modules 102. The set of antenna modules 102 includes the first antenna module and the second antenna module. In one embodiment, each antenna module of the set of antenna modules 102 includes at least twelve antenna elements 104. Each antenna module 102 is separated from adjacent antenna modules 102 by an edge 110.

As depicted in FIG. 1D, each antenna module 102 of the phased array antenna structure 100 includes three rows and eight columns of antenna elements 104, and twelve total antenna elements 104. However, in other embodiments, antenna modules can have a different number of rows and columns of antenna elements as well as a different number of total antenna elements.

In one embodiment, the phased array antenna structure 100 includes 4992 antenna elements 104 and each antenna module 102 includes twelve antenna elements 104, therefore the phased array antenna structure 100 includes 416 antenna modules 102. It should be noted that FIG. 1D does not show every antenna element of the phased array antenna structure 100. In another embodiment, the phased array antenna structure 100 includes a first number of antenna modules 102 and each antenna module includes a second number of antenna elements 104. In such a case, the phased array antenna includes a third number of antenna elements 104 equal to the first number multiplied by the second number. In one embodiment, a digital beam former (DBF) of the phased array antenna controls thirty-six antenna elements and the number of antenna elements 104 that an antenna module 102 can include is factor of thirty-six. In another embodiment, a DBF controls a first number of antenna elements and the number of antenna elements that an antenna module can include is a factor of the first number.

As depicted in FIG. 1D, each row of antenna modules 102 is shifted with respect to an adjacent row of antenna modules 102 by one column of antenna elements 104. In other embodiments, each row of antenna modules 102 can be shifted with respect to an adjacent row of antenna modules 102 by two, three, four, or more columns of antenna elements 104.

In one embodiment, a radio frequency (RF) module circuit is coupled to the phased array antenna, including the antenna modules 102, via RFFE circuitry. Alternatively, a microwave radio or other signal source can be coupled to the antenna modules 102. Each of the antenna modules 102 can be coupled physically to the support structure and electrically coupled to a communication system, such as RF radio or a microwave radio. The antenna modules 102 can be coupled to a circuit board or other types of support structures.

Although the antenna modules 102 with antenna elements 104 arranged in a triangular pattern are described as being used for a phased array antenna, in other embodiments any antenna elements can be arranged in a triangular pattern on a rectangular antenna module.

Figure 1E:
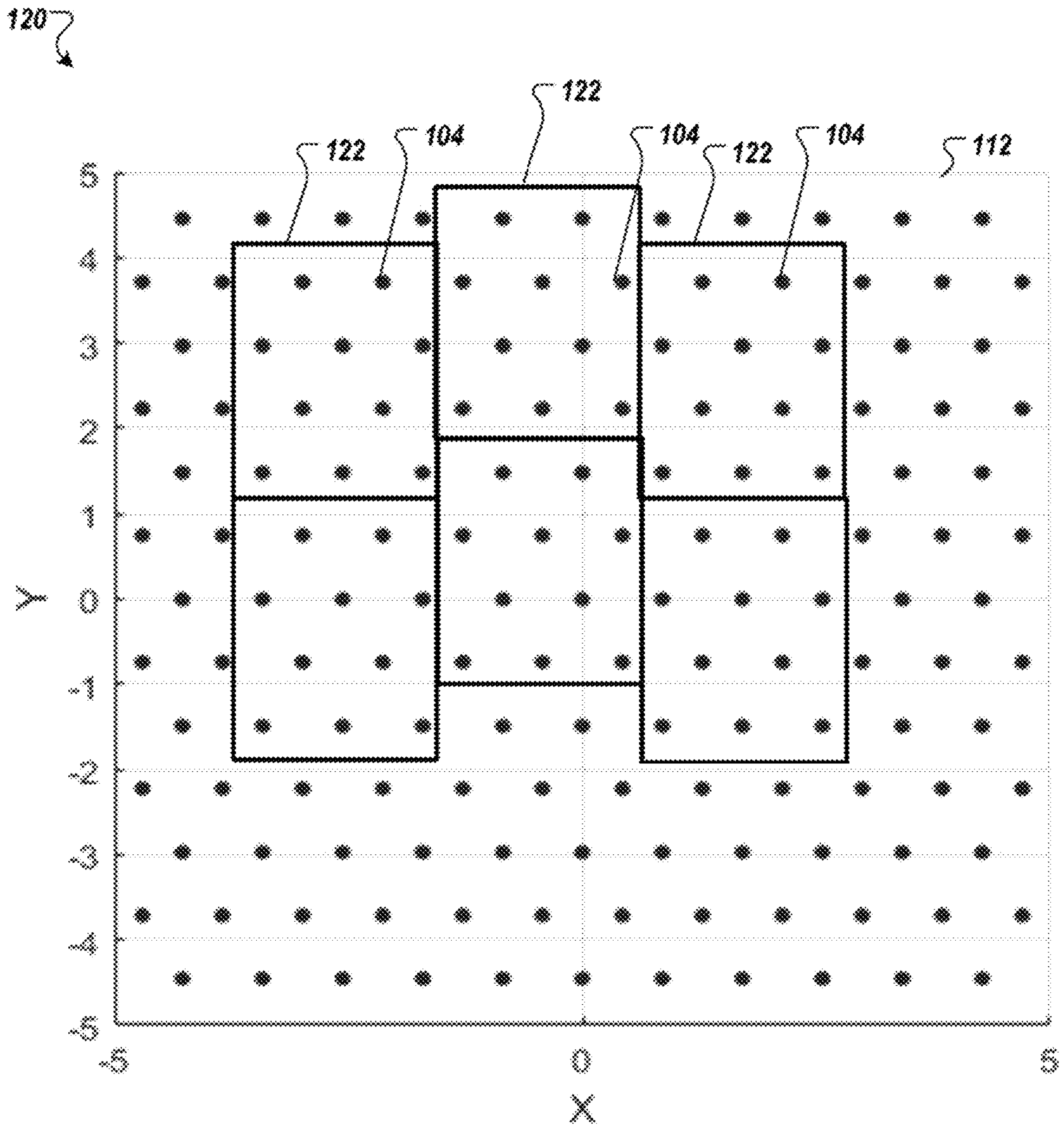
FIG. 1E is a schematic diagram of a phased array antenna structure constructed from antenna modules according to one embodiment.

FIG. 1E is a schematic diagram of a phased array antenna structure 120 constructed from antenna modules 122 according to one embodiment. The phased array antenna structure 120 is similar to the phased array antenna structure 100 of FIG. 1D except that it is constructed of antenna modules 122. Each of the antenna modules 122 includes four rows and five columns of antenna elements 104 (and feed points, not shown in FIG. 1E). Each of the antenna modules 122 includes ten antenna elements 104. As depicted in FIG. 1E, each column of antenna modules 122 is shifted with respect to an adjacent column of antenna modules 122 by one row of antenna elements 104. In other embodiments, each column of antenna modules 122 can be shifted with respect to an adjacent column of antenna modules 122 by two, three, four, or more rows of antenna elements 104.

Figure 1F:
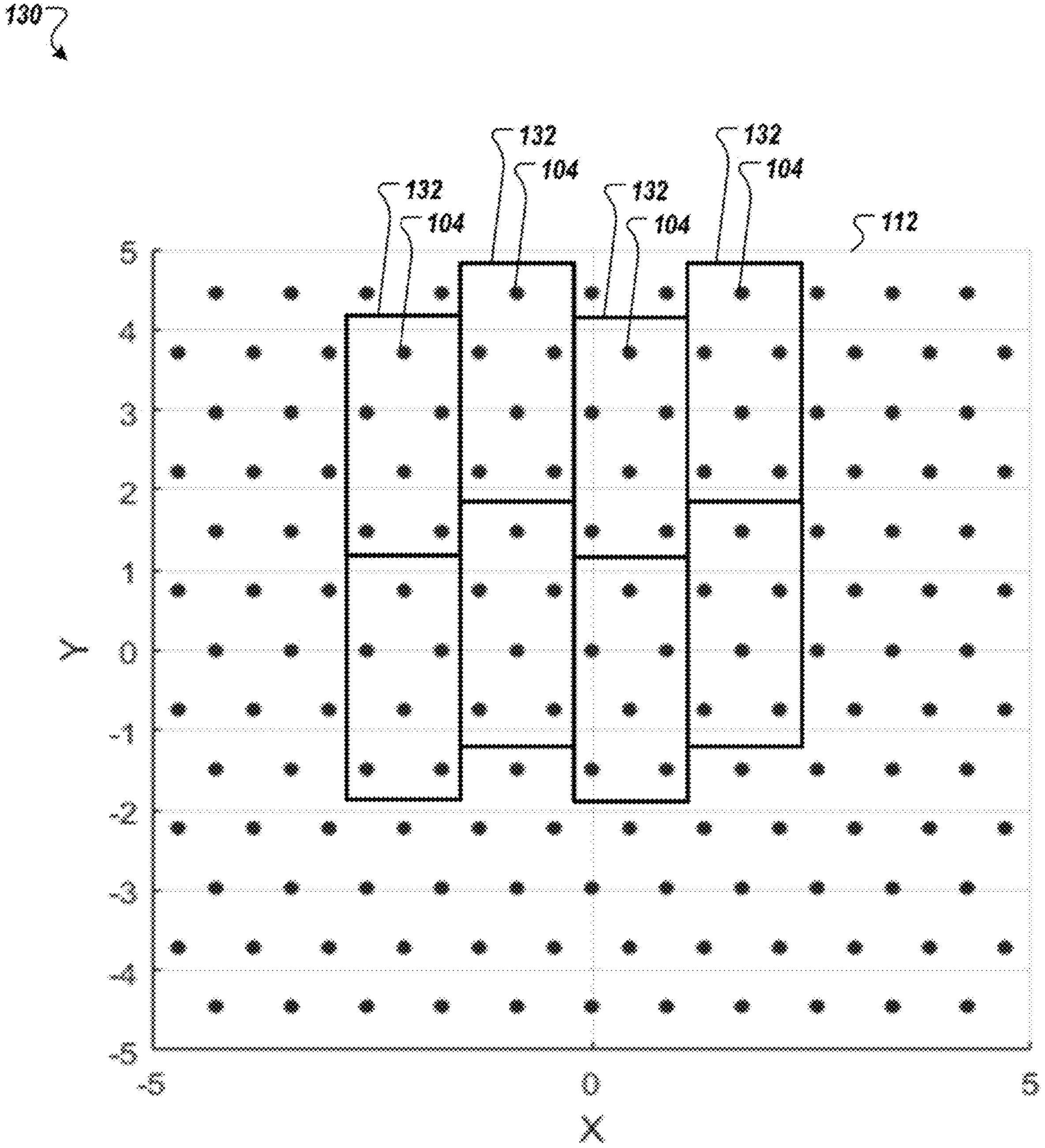
FIG. 1F is a schematic diagram of a phased array antenna structure constructed from antenna modules according to one embodiment.

FIG. 1F is a schematic diagram of a phased array antenna structure 130 constructed from antenna modules 132 according to one embodiment. The phased array antenna structure 130 is similar to the phased array antenna structure 100 of FIG. 1D except that it is constructed of antenna modules 132. Each of the antenna modules 132 includes four rows and three columns of antenna elements 104 (and feed points, not shown in FIG. 1F). Each of the antenna modules 132 includes six antenna elements 104. As depicted in FIG. 1F, each column of antenna modules 132 is shifted with respect to an adjacent column of antenna modules 132 by one row of antenna elements 104. In other embodiments, each column of antenna modules 132 can be shifted with respect to an adjacent column of antenna modules 132 by two, three, four, or more rows of antenna elements 104.

Figure 1G:
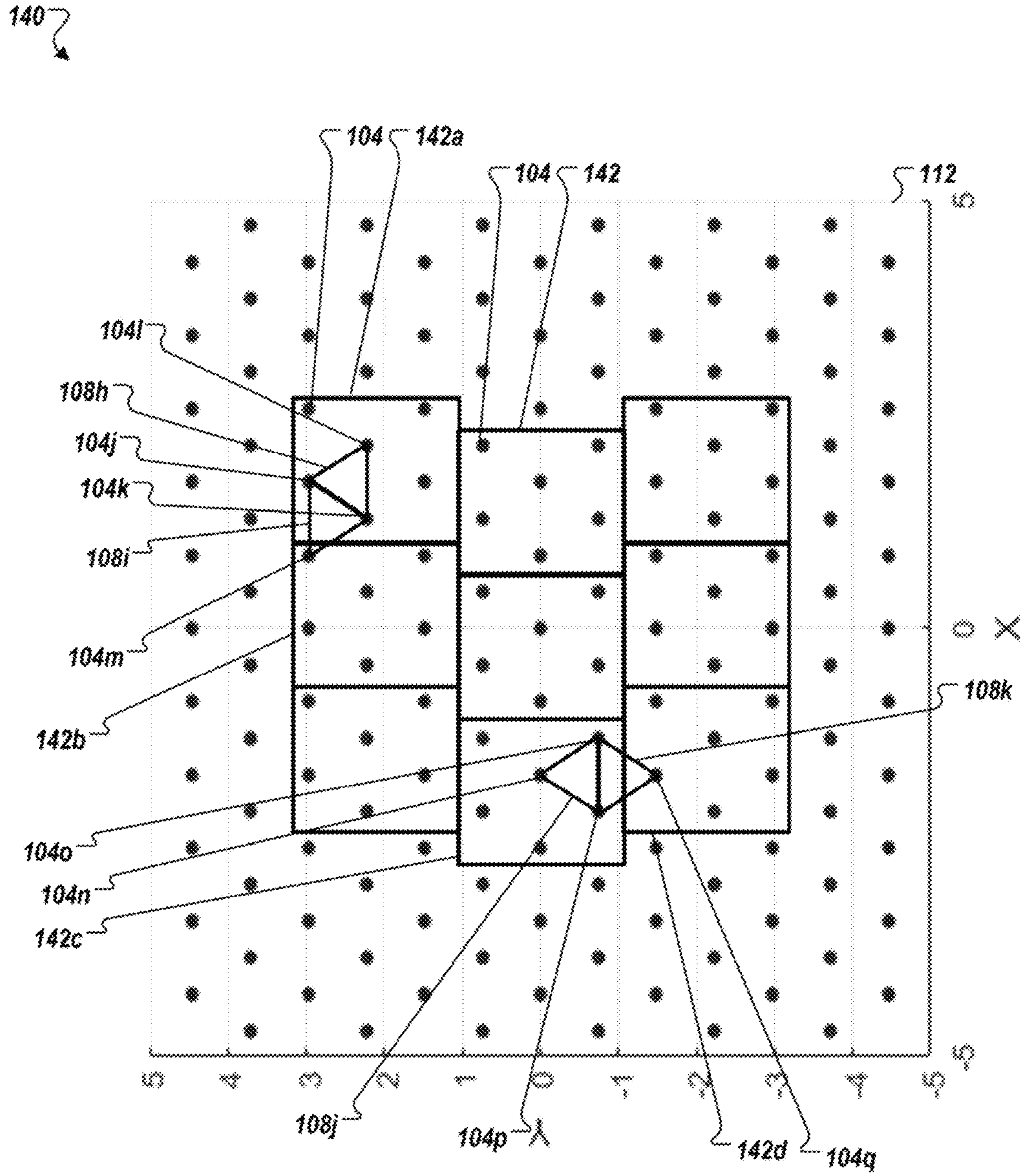
FIG. 1G is a schematic diagram of a phased array antenna structure constructed from antenna modules according to one embodiment.

FIG. 1G is a schematic diagram of a phased array antenna structure 140 constructed from antenna modules 142 according to one embodiment. The phased array antenna structure 140 is similar to the phased array antenna structure 100 of FIG. 1D except that it is constructed of antenna modules 142. In FIG. 1G, the phased array antenna structure 100 is rotated by 90 degrees with respect to the phased array antenna structure 100 of FIG. 1D. Each of the antenna modules 142 includes four rows and three columns of antenna elements 104 (and feed points, not shown in FIG. 1G). Each of the antenna modules 142 includes six antenna elements 104. As depicted in FIG. 1G, each column of antenna modules 142 is shifted with respect to an adjacent column of antenna modules 132 by one row of antenna elements 104. In other embodiments, each column of antenna modules 132 can be shifted with respect to an adjacent column of antenna modules 132 by two, three, or more rows of antenna elements 104.

The phased array antenna structure 140 includes a support structure 112. A first antenna module 142*a* is coupled to the support structure 212. The first antenna module 142*a* has a rectangle shape and a first set of antenna elements 104 disposed in a triangular arrangement within the rectangle shape. In one embodiment, the first set of antenna elements 104 is disposed on the first antenna module 202. Any two adjacent antenna elements 104 within the first antenna module 142*a* are spaced by a first distance. Each antenna element 104 has a first size that is less than or approximately equal to half of the first distance. Additionally, a second antenna module 142*b* that is identical to the first antenna module 142*a* is coupled to the support structure 112 and is adjacent to (in this case, below) the first antenna module 142*a*. The second antenna module includes a second set of antenna elements 104. An antenna element 104 of the first antenna module 142*a* is adjacent to and separated by at least the first distance from an antenna element 104 of the second antenna module 142*b*. In one embodiment the first set of antenna elements 104 of the first antenna module 142*a* includes a first column, a second column, and a third column of antenna elements 104. The second set of antenna elements 104 of the second antenna module 242*b* includes a first column, a second column, and a third column of antenna elements 104. The first column of the second antenna module 142*b* is aligned with the first column of the of the first antenna module 142*a*. The second column of the second antenna module 142*b* is aligned with the second column of the of the first antenna module 142*a*. The third column of the second antenna module 142*b* is aligned with the third column of the of the first antenna module 142*a*. The second column of the first antenna module 142*a* is offset from the first column and the third column of the first antenna module 142*a* such that a first feed point of a first antenna element 104*j* of the first column of the first antenna module 142*a*, a second feed point of a second antenna element 104*k* of the second column of the first antenna module 142*a*, and a third feed point of a third antenna element 104*l* of the second column of the first antenna module 142*a* are located to form a first equilateral triangle 108*h*. Further, the second column of the second antenna module 142*b* is offset from the first column and the third column of the second antenna module 142*b* such that the first feed point of the first antenna module 142*a*, the second feed point of the first antenna module 142*a*, and a fourth feed point of a first antenna element 104*m* of the first column of the second antenna module 142*b* are located to form a second equilateral triangle 108*i* that is identical to but inverted with respect to the first equilateral triangle 108*h*.

In another embodiment, a third antenna module 142*c* is coupled to the support structure 112 and includes a third set of antenna elements 104. The third set of antenna elements 104 includes a first column, a second column, and a third column of antenna elements 104. The second column of the third set of antenna elements 104 is offset from the first column and the third column of antenna elements of the third antenna module 142*c* such that a first feed point of a first antenna element 104*n* of the second column, a second feed point of a second antenna element 104*o* of the third column, and a third feed point of a third antenna element 104*p* of the third column are located to form a third equilateral triangle 108*j* that has the same dimensions as the first equilateral triangle 108*h*. Further, a fourth antenna module 142*d* is coupled to the support structure 112 and includes a fourth set of antenna elements 104. The fourth set of antenna elements 104 includes a first column, a second column, and a third column of antenna elements 104. The second column of the fourth set of antenna elements 104 is offset from the first column and the third column of antenna elements of the fourth antenna module 142*d* such that the second feed point of the antenna element 1040, the third feed point of the antenna element 104*p*, and a first feed point of a first antenna element 104*q* of the first column of the fourth antenna module 142*d* form a forth equilateral triangle 108*k* that has the same dimensions as the first equilateral triangle 108*h*.

Figure 2:
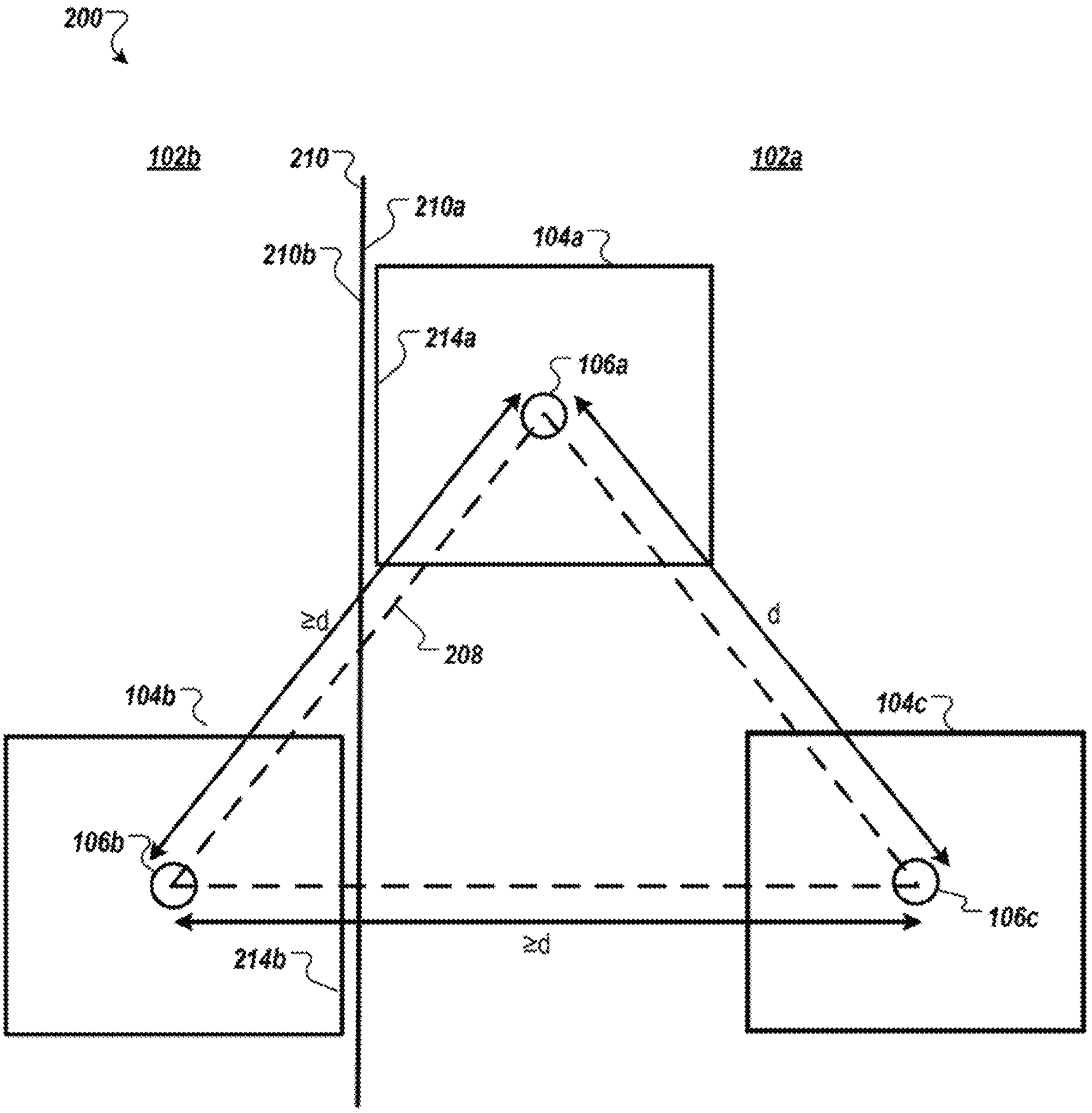
FIG. 2 is a schematic diagram of a phased array antenna structure with an edge between a first antenna module and a second antenna module according to one embodiment.

FIG. 2 is a schematic diagram of a phased array antenna structure 200 with an edge 110 between a first antenna module 202*a* and a second antenna module 102*b* according to one embodiment. Although not all components of the phased array antenna structure 200 are shown, the phased array antenna structure 200 is the same or similar to the phased array antenna structure 100 of FIG. 1D, the phased array antenna structure 120 of FIG. 1E, the phased array antenna structure 130 of FIG. 1F, or the phased array antenna structure 140 of FIG. 1G. The antenna modules 102, the antenna elements 104, the feed points 106 of FIG. 2, are the same as the antenna modules 102, the antenna elements 104, the feed points 106 of FIGS. 1A-1G. An edge 210 separates the first antenna module 102*a* from the second antenna module 102*b*. The edge 210 represents a boundary between the first antenna module 102*a* and the second antenna module 102*b*. Each antenna module 102 has its own edge. The antenna module 102*a* has an edge 210*a* and the antenna module 102*b* has an edge 210*b*. Further each antenna module 102 has at least one antenna element 104 that is the closest to the edge 210. As depicted in FIG. 2, the antenna element 104*a* is closest to the edge 210*a* of the antenna module 102*a* and the antenna element 104*b* is closest to the edge 210*b* of the antenna module 102*b*.

In the depicted embodiment, the antenna elements 104 are rectangular in shape and two sides of the rectangular shape are parallel with the edge 210. Each antenna element 104 has a size(s) that is less than half of the first distance in order to prevent any antenna element 104 from physically contacting any other adjacent antenna element 104. The antenna element 104 that is the closest to the edge 210 of the antenna module 102 has one side 214 that is the closest to the edge 210. A side 214*a* of the antenna element 104*a* is closest to the edge 210*a* and a side 214*b* of the antenna element 104*b* is closest to the edge 210*b*. The edge 210*a* and the side 214*a* are separated by a first margin (e.g., that is measured as a distance). The edge 210*b* and the side 214*b* are separated by a second margin. The first margin and the second margin can be the same or different. The first margin and the second margin are less than half of a first distance (e.g., the first distance (d) as described with respect to FIGS. 1A-1G) that separates two adjacent antenna elements 104*a* and 104*c* within the antenna module 102*a*. Two adjacent antenna elements 104 within two adjacent antenna modules 102 are separated by at least the first distance (≥d) due to the first margin and the second margin. In particular, the antenna element 104*a* is separated from the antenna element 104*b* by at least the first distance and the antenna element 104*b* is separated from the antenna element 104*c* by at least the first distance. The first margin and the second margin can be taken into account in the design and manufacturing of antenna modules 102 such that the triangle 208 is an equilateral triangle. In some other embodiments, the first margin and the second margin are not taken into account in the design and manufacturing of antenna modules 102 such that the triangle 208 is an isosceles triangle. In such a case, the isosceles triangle shape of the triangle 208 can be accounted for by a processing logic that controls the DBF for beam forming and beam steering. In some embodiments, the first margin and the second margin are sufficiently small that the triangle 208 is approximately or effectively an equilateral triangle.

In some embodiments, the antenna elements can have another shape other than rectangular, such as triangular, circular, elliptical, and the like. In these cases, the first margin and the second margin are measured as the distance between the edge 210 and the point (or side) of the antenna element that is the closest to the edge 210.

Figure 3A:
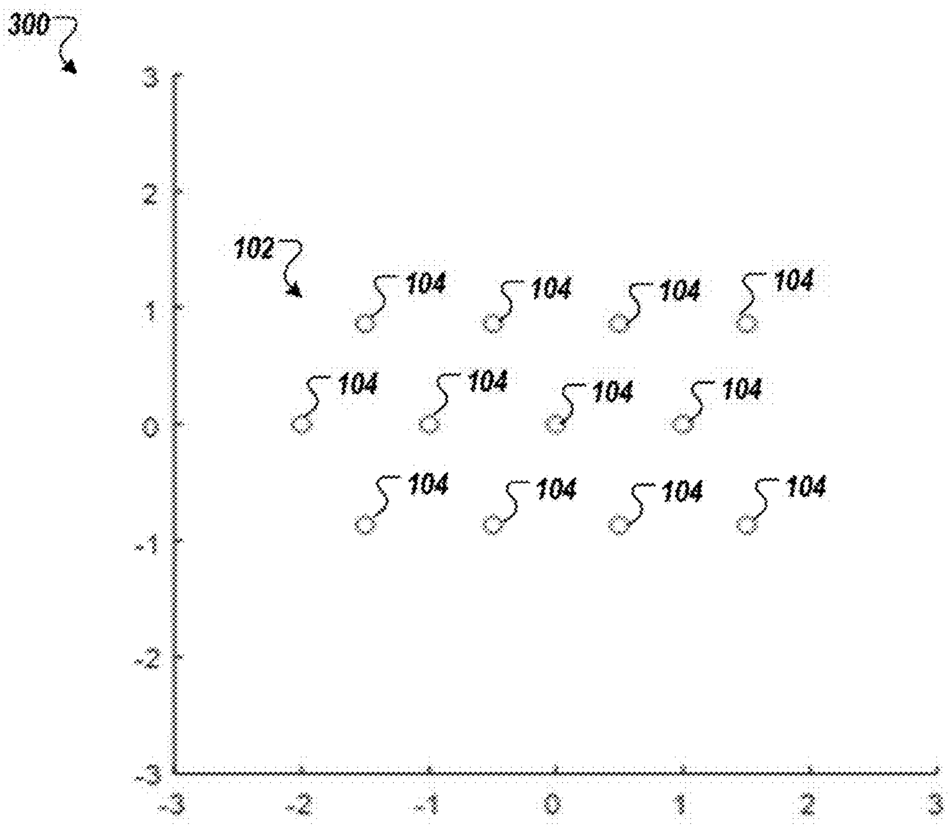
FIG. 3A is a schematic diagram of a triangular arrangement of antenna elements on an antenna module of a phased array antenna according to one embodiment.

FIG. 3A is a schematic diagram of a triangular arrangement of antenna elements 104 on an antenna module 102 of a phased array antenna structure 300 according to one embodiment. Although not all components of the phased array antenna structure 300 are shown, the phased array antenna structure 300 is the same or similar to the phased array antenna structure 100 of FIG. 1D. The antenna module 102 and the antenna elements 104 are the same as the antenna modules 102 and the antenna elements 104 of FIGS. 1A-1D.

Figure 3B:
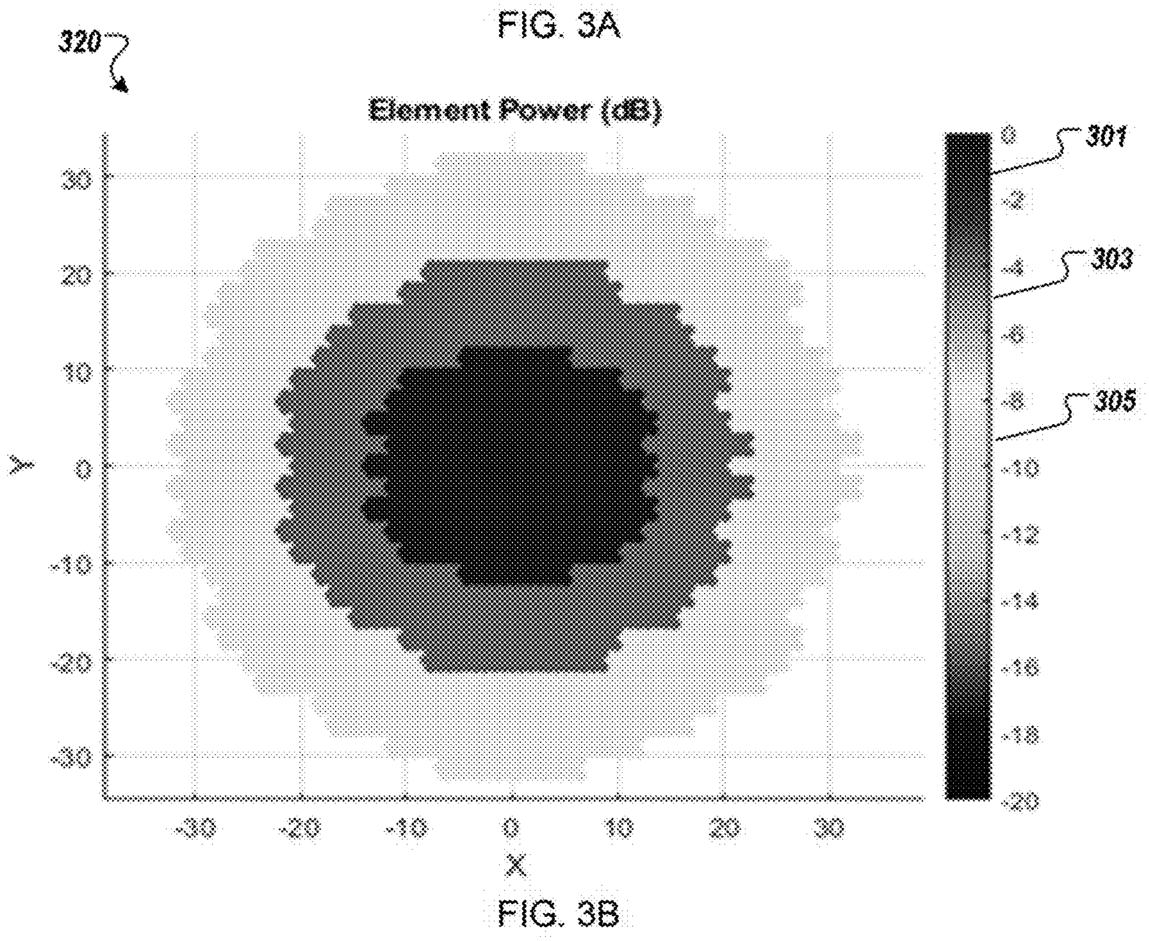
FIG. 3B is a graph of a power distribution of antenna elements of a phased array antenna structure according to one embodiment.

FIG. 3B is a graph of a power distribution 320 of antenna elements of a phased array antenna structure 300 according to one embodiment. Although not all components of the phased array antenna structure 300 are shown, the phased array antenna structure 300 is the same or similar to the phased array antenna structure 100 of FIG. 1D. The shape of the power distribution 320 represents the shape of the phased array antenna structure 300. In other words, antenna modules are arranged such that the antenna elements are organized on a triangular lattice in the same shape as the power distribution 320. In the depicted embodiments, a first set of antenna elements that are in the center of the phased array antenna structure 300 are set to a first power level 301 of between approximately 0 decibels (dB) and −2 dB, a second set antenna elements that are further out from the center of the phased array antenna structure 300 are set to a second power level 303 of between approximately −2 dB and −6 dB, and a third set antenna elements that are furthest from the center of the phased array antenna structure 300 are set to a third power level 305 of approximately −6 dB to −10 dB. Each antenna element in the first set is set to the first power level 301. Each antenna element in the second set is set to the second power level 303. Each antenna element in the third set is set to the third power level 305. In the depicted embodiment, there are 4992 antenna elements, and their respective power is tapered from the center to the edge in three steps.

Figure 3C:
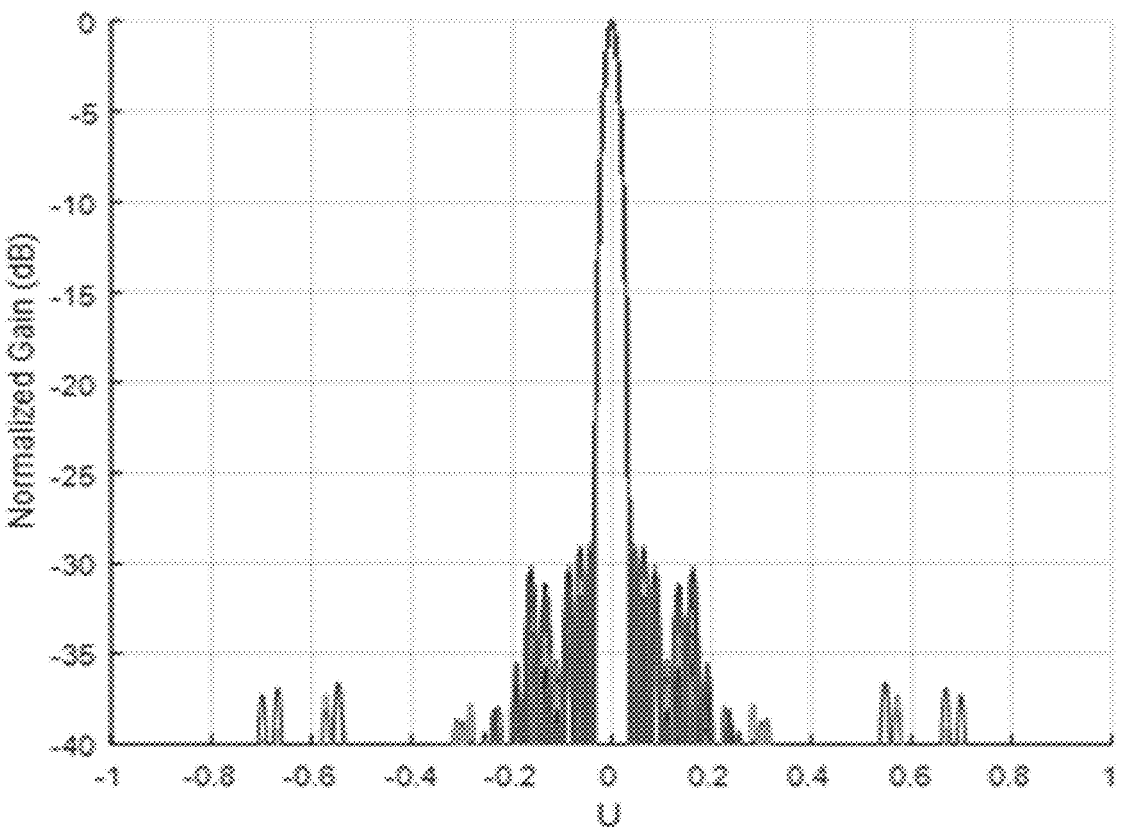
FIG. 3C is a graph of a normalized gain as a function of angle (U=sin(θ)) of a phased array antenna structure according to one embodiment.

FIG. 3C is a graph of a normalized gain 340 as a function of angle ($U=\sin(\theta)$) of a phased array antenna structure 300 according to one embodiment. Although not all components of the phased array antenna structure 300 are shown, the phased array antenna structure 300 is the same or similar to the phased array antenna structure 100 of FIG. 1D. In one embodiment, a normalized gain can be obtained by taking a Fourier transform of the power distribution 320 of FIG. 3B. The normalized gain 340 can be obtained by taking slices of the Fourier transform of the power distribution 320 and overlaying each slice. In the depicted embodiment, an array factor peak and side lobes are optimized for −29 dBc. Further, a beam profile is maximal at approximately an angle of U=0 and there are grating lobes (e.g., side lobes) at U≈±0.2 and U≈±0.5 to ±0.7. This graph shows that there is a reduction in the grating lobes.

Figure 4A:
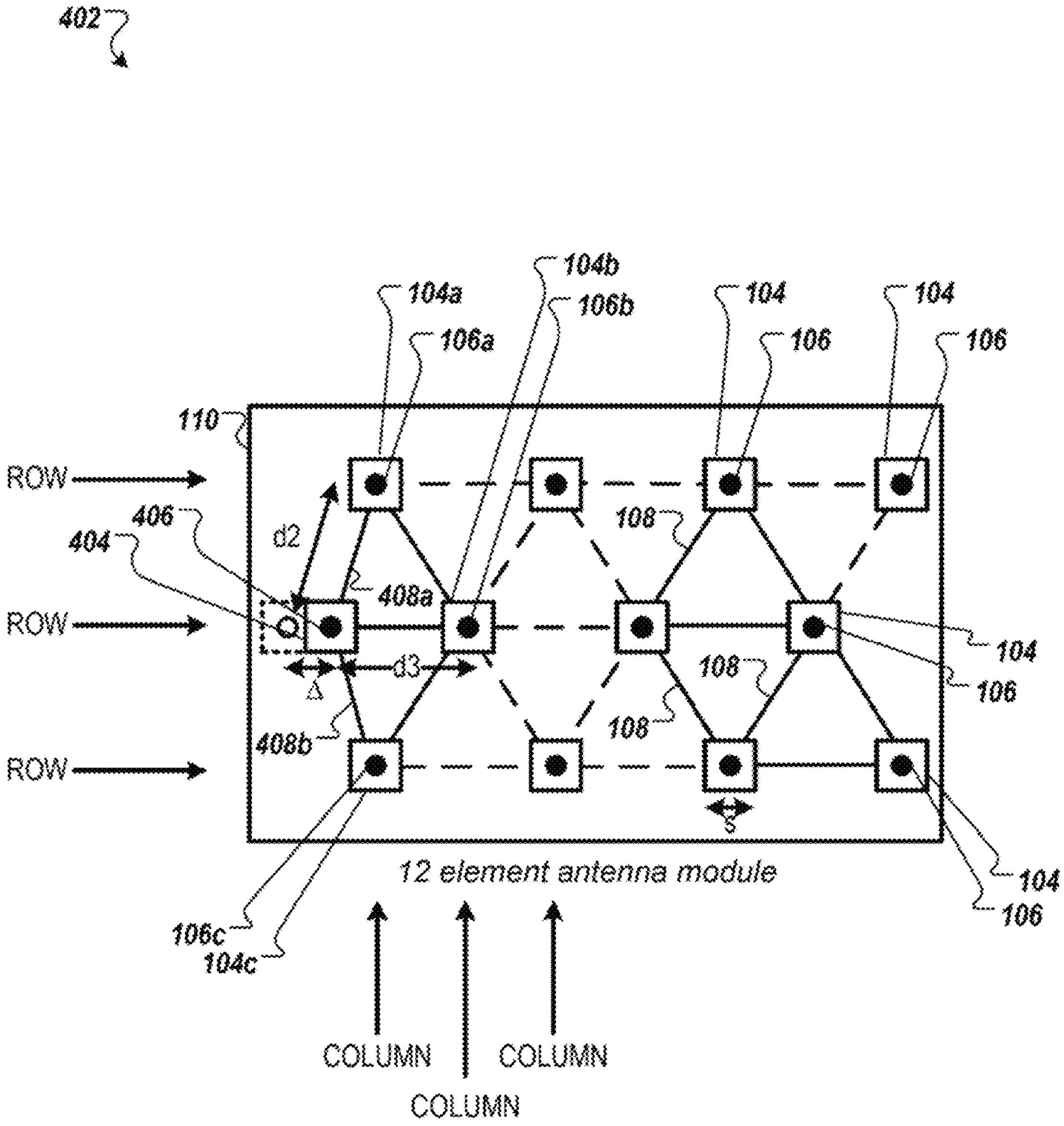
FIG. 4A is a schematic diagram of an antenna module with one shifted antenna element of a phased array antenna structure according to one embodiment.

FIG. 4A is a schematic diagram of an antenna module 402 with one shifted antenna element 404 of a phased array antenna structure according to one embodiment. The antenna module 402 is similar to the antenna module 102 of FIGS. 1A-1D except with one antenna element 404 that is shifted off of the triangular arrangement (e.g., a feed point 406 of the antenna element 404 is shifted to be off of the triangular lattice pattern). Each antenna element 104 and feed element 106 is the same as the antenna elements 104 and the feed elements 106 of FIGS. 1A-1D. The antenna elements 104 form equilateral triangles 108 as described with respect to FIGS. 1A-1D. Adjacent antenna elements 104 are separated by a first distance (d). The antenna elements 404 and the feed points 406 are identical to the antenna elements 104 and the feed points 106. In one embodiment, each feed point 106 of the antenna module 102 is located at a lattice point of an equilateral triangular lattice except a first feed point 406 of an antenna element 404 that is offset from a corresponding lattice point by an offset distance (Δ). The offset distance is a percentage value of the first distance. The antenna element 404 is adjacent to an edge 110 of the antenna module 402. In one embodiment, the triangular arrangement of the antenna elements 104 is part of at least one of a rhombic lattice (e.g., an isosceles triangular lattice), a hexagonal lattice, an equilateral triangular lattice, or a parallelogrammic lattice (e.g., a scalene triangular lattice).

In one embodiment, the antenna elements 104 and the antenna element 404 are organized as a first row, a second row, and a third row. The antenna element 404 is part of the second row. A direction of the offset of a feed point 406 of the antenna element 404 can be in a direction along the second row. The feed point 406 of the antenna element 404, a first feed point 106*a* of a first antenna element 104*a* of the first row, and a second feed point 106*b* of a second antenna element 104*b* of the second row form a first scalene triangle 408*a*. The feed point 406, the feed point 106*b*, and a feed point 106*c* of an antenna element 104*c* of the third row form a second scalene triangle 408*b* that has the same dimensions as but is inverted with respect to the first scalene triangle 408*a*. The antenna element 404 is separated from the antenna element 104*a* of the first row and the antenna element 104*c* of the third row by a second distance (d2) that is less than the first distance. The antenna element 404 is separated from the antenna element 104*b* of the second row by a third distance (d3) that is less than the first distance and the second distance.

In one embodiment, feed points 106 of the antenna elements 104 are located at a lattice point in a triangular lattice. The triangular lattice includes a set of lattice points and three mutually adjacent lattice points form an equilateral triangle. The feed point 406 of the antenna element 404 is offset (e.g., shifted) from a corresponding lattice point that forms an equilateral triangle with two mutually adjacent lattice point. The feed point 406 is shifted so as to increase a distance between the feed point 406 and the edge 110.

In other embodiments, the antenna element 404 can be shifted off of the triangular grid by the offset distance and by a second offset distance that is perpendicular to the offset distance. In this case, the antenna element 404 is shifted off of the second row.

Figure 4B:
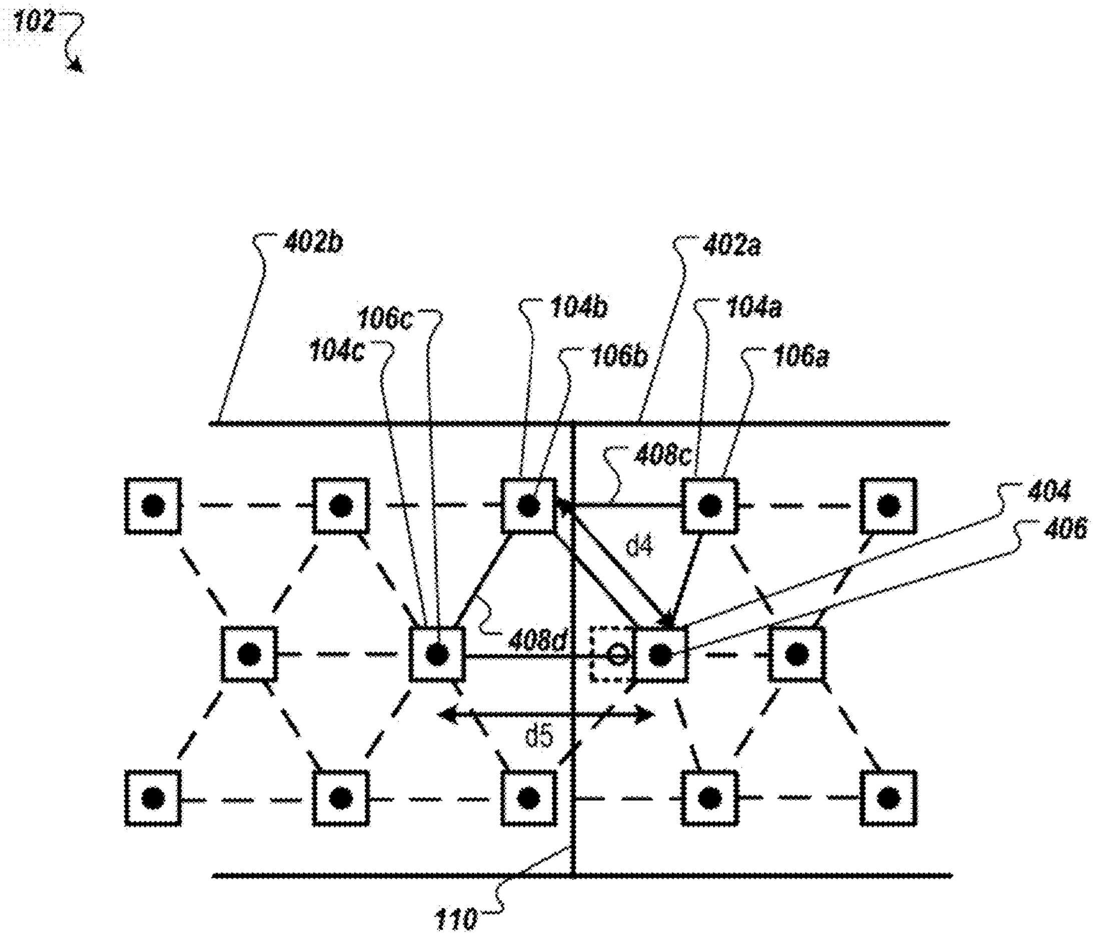
FIG. 4B is a schematic diagram of a first antenna module and a second antenna module of a phased array antenna structure according to one embodiment.

FIG. 4B is a schematic diagram of a first antenna module 402*a* and a second antenna module 402*b* of a phased array antenna structure according to one embodiment. The first antenna module 402*a* and the second antenna module 402*b* are the same as the antenna module 402 of FIG. 4A. The first antenna module 402*a* and the second antenna module 402*b* are identical, except for their position on the phased array antenna structure. As depicted, the first antenna module 402*a* is adjacent to (e.g., to the right of) the second antenna module 402*b* (which is to the left of the first antenna module 402*a*). Alternatively, the first antenna module 402*a* can be adjacent to (e.g., to the left of) the second antenna module 402*b* (which can be to the right of the first antenna module 402*a*). The first antenna module 402*a* and the second antenna module 402*b* share an edge 110. In one embodiment, the first antenna module 402*a* and the second antenna module 402*b* are coupled to a support structure (not shown in FIG. 4B) of a phased array antenna structure.

In a further embodiment, a first row of antenna elements 104 of the second antenna module 402*b* is aligned with a first row of antenna elements 104 of the first antenna module 402*a*, a second row of antenna elements of the second antenna module 402*b* is aligned with a second row of antenna elements 104 and antenna element 404 of the first antenna module 402*a*, and a third row of antenna elements 104 of the second antenna module 402*b* is aligned with a third row of antenna elements 104 of the first antenna module 402*a*. A feed point 406 of the antenna element 404 of the second row of the first antenna module 402*a*, a feed point 106*a* of the antenna element 104*a* of the first row of the first antenna module 402*a*, and a feed point 106*b* of an antenna element 104*b* of the first row of the second antenna module 402*b* are located to form a first scalene triangle 408*c*. Further, the feed point 406, the feed point 106*b*, and a feed point 106*c* of an antenna element 104*c* of the second row of the second antenna module 402*b* form a second scalene triangle 408*d*. Each feed point 106 of the antenna elements 104 are part of a triangular lattice pattern of feed points with offset feed points 406 of the antenna elements 404 of the phased array antenna structure.

In one embodiment, the antenna element 404 of the second row of the first antenna module 402*a* is separated from the antenna element 104*b* of the first row of the second antenna module 402*b* by a fourth distance (d4). The antenna element 404 is separated from the antenna element 104*c* of the second row of the second antenna module 402*b* by a fifth distance (d5). The fourth distance and the fifth distance are larger than the first distance (d) as described with respect to FIGS. 1A-1D. The fifth distance is larger than the fourth distance.

Figure 4C:
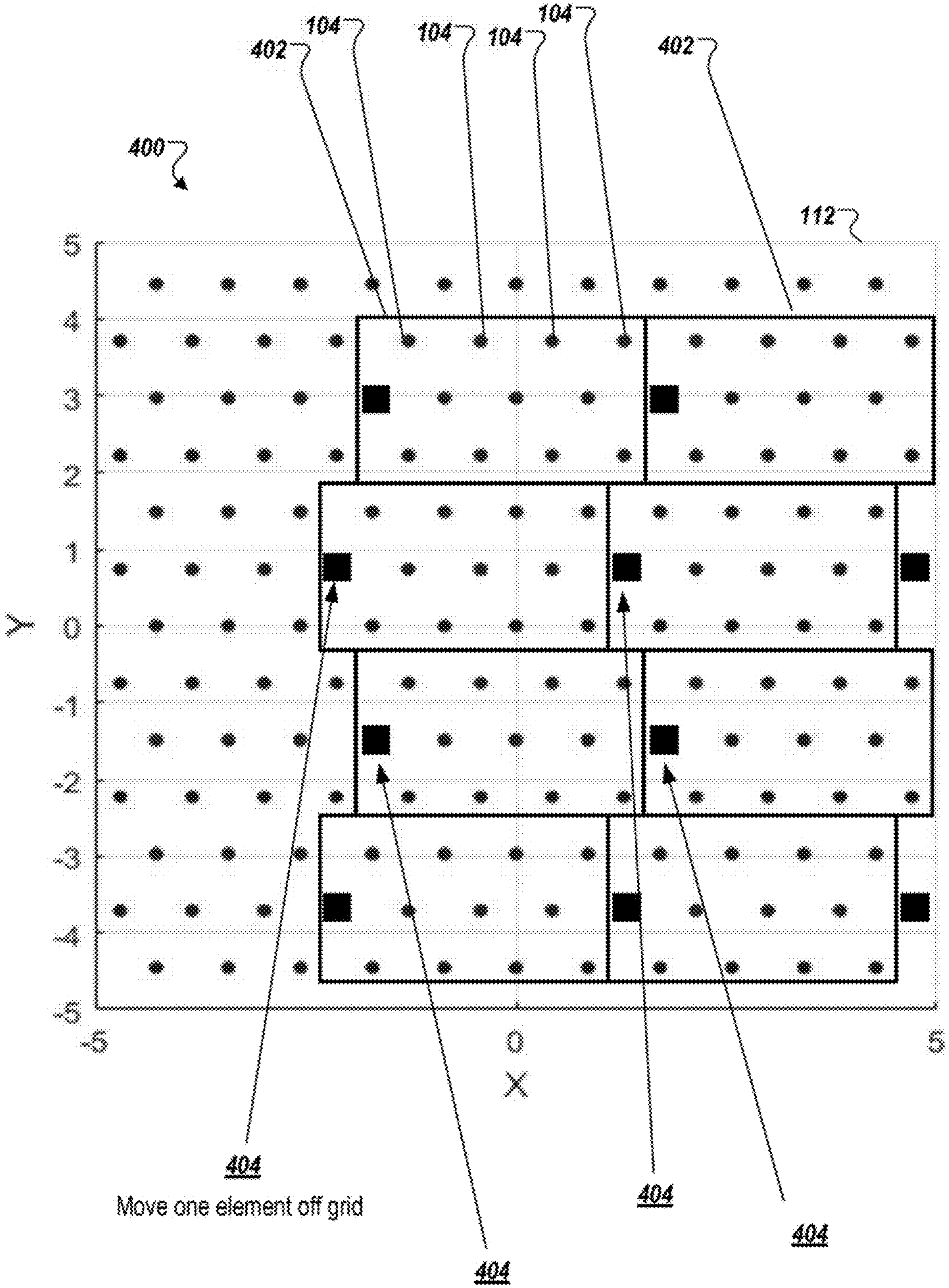
FIG. 4C is a schematic diagram of a phased array antenna structure constructed from antenna modules with one shifted antenna element according to one embodiment.

FIG. 4C is a schematic diagram of a phased array antenna structure 400 constructed from antenna modules 402 with one shifted antenna element 404*a* according to one embodiment. Although not all components of the antenna modules 402 are shown, the antenna modules 402 are the same or similar to the antenna modules 402 of FIGS. 4A-4B. In particular and for simplicity, the points represent the antenna elements 104 and 404, and the feed points 106 and 406 are not shown in FIG. 4C. The phased array antenna structure 100 includes a support structure 112. Each antenna element 104 that is not adjacent to an antenna element 404 is located to form an equilateral triangle with corresponding adjacent antenna elements 104. Antenna elements 104 that are adjacent to a shifted antenna element 404 are located to form scalene triangles as described with respect to FIGS. 4A-4B. The antenna elements 404 are represented as squares and the antenna elements 104 are represented as circles in FIG. 4C.

As depicted in FIG. 4C, each antenna module 402 of the phased array antenna structure 400 includes three rows and eight columns of antenna elements 104, and twelve total antenna elements (e.g., eleven antenna elements 104 and one antenna element 404). However, in other embodiments, antenna modules can have a different number of rows and columns of antenna elements as well as a different number of total antenna elements (e.g., a different number of antenna elements 104 and a different number of antenna elements 404).

In one embodiment, the phased array antenna structure 400 includes 4992 antenna elements and each antenna module 402 includes eleven antenna elements 104 and one antenna element 404, therefore the phased array antenna structure 400 includes 416 antenna modules 402. It should be noted that FIG. 4C does not show every antenna element of the phased array antenna structure 400.

In one embodiment, a RF module circuit is coupled to the phased array antenna, including the antenna modules 402, via the RFFE circuitry. Alternatively, a microwave radio or other signal source can be coupled to the antenna modules 402. Each of the antenna modules 402 can be coupled physically to the support structure and electrically coupled to a communication system, such as RF radio or a microwave radio. The antenna modules 402 can be coupled to a circuit board or other types of support structures.

Figure 5A:
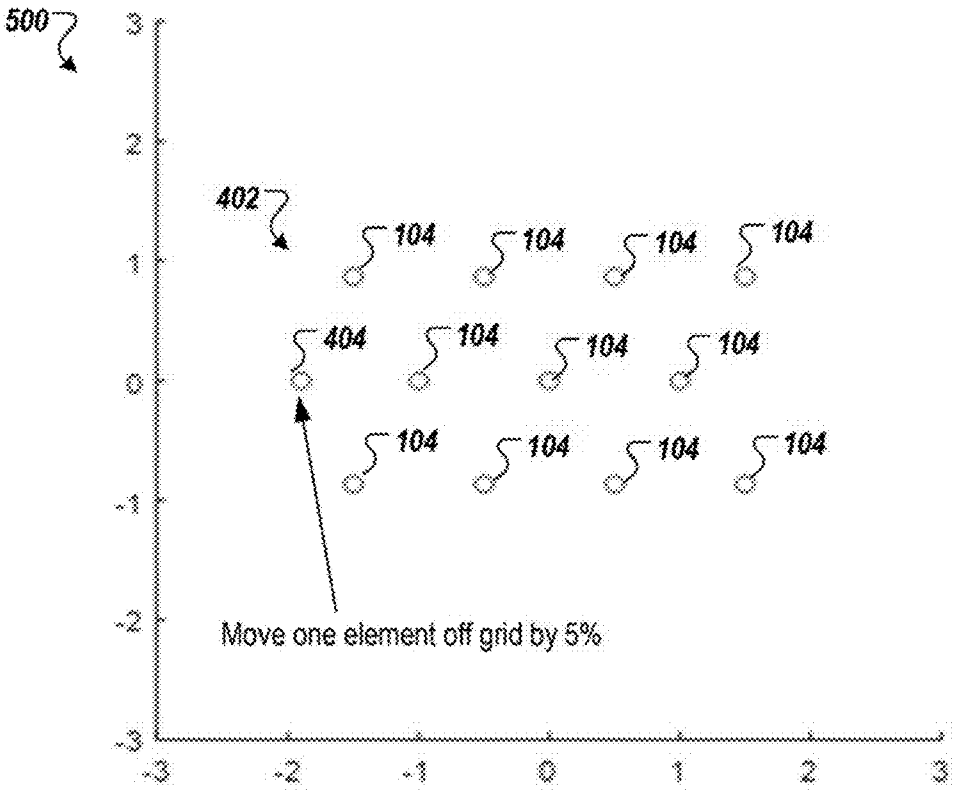
FIG. 5A is a schematic diagram of a triangular arrangement of antenna elements 104 with one offset antenna element on an antenna module of a phased array antenna according to one embodiment.

FIG. 5A is a schematic diagram of a triangular arrangement of antenna elements 104 with one offset antenna element 404 on an antenna module 402 of a phased array antenna structure 500 according to one embodiment. Although not all components of the phased array antenna structure 500 are shown, the phased array antenna structure 500 is the same or similar to the phased array antenna structure 400 of FIG. 4C. The antenna module 402 and the antenna elements 404 are the same as the antenna modules 402 and the antenna elements 404 of FIGS. 4A-4C. The antenna elements 104 are the same as the antenna elements 104 of FIGS. 1A-1D. In the depicted embodiment, the offset distance (Δ) is five percent (5%) of the first distance (d) (e.g., as described with respect to FIGS. 1A-1D).

Figure 5B:
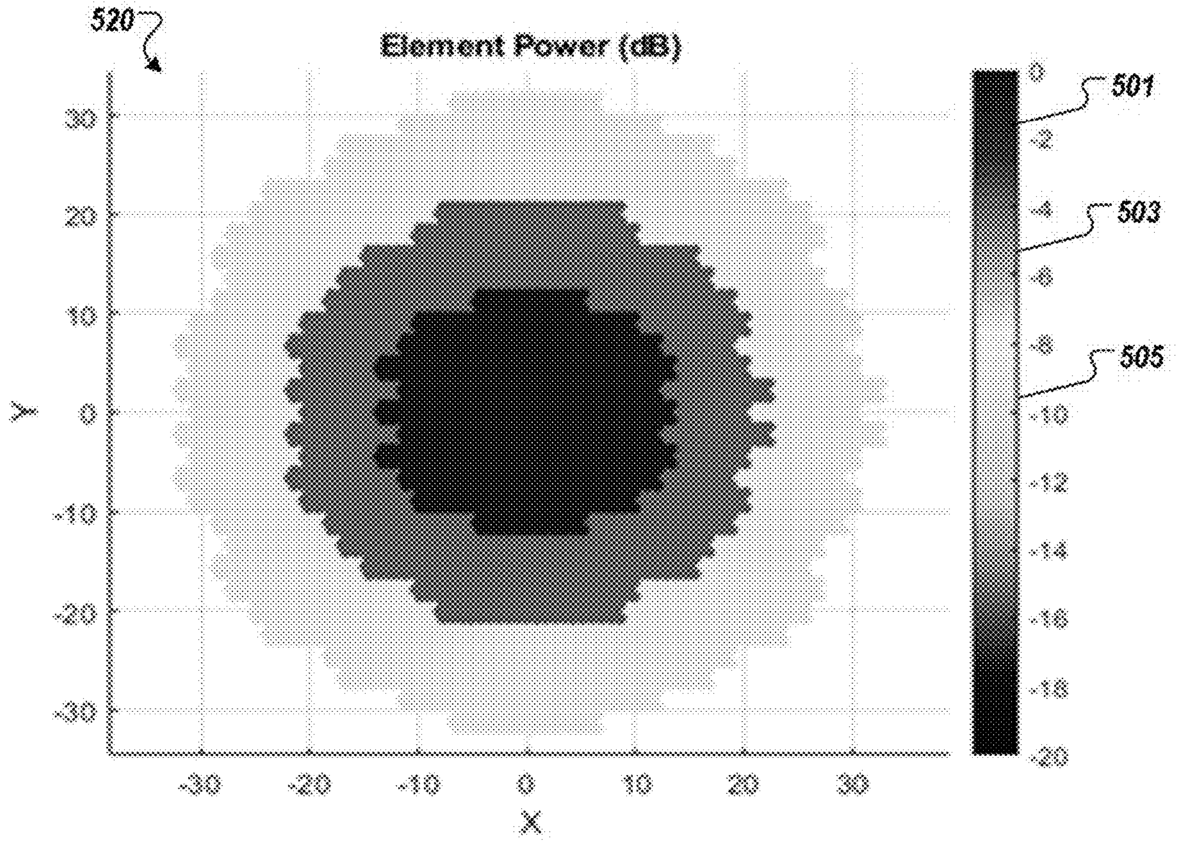
FIG. 5B is a graph of a power distribution of antenna elements of the phased array antenna structure according to one embodiment.

FIG. 5B is a graph of a power distribution 520 of antenna elements of the phased array antenna structure 500 according to one embodiment. Although not all components of the phased array antenna structure 500 are shown, the phased array antenna structure 500 is the same or similar to the phased array antenna structure 400 of FIG. 4C. The shape of the power distribution 520 represents the shape of the phased array antenna structure 400. In other words, antenna modules are arranged such that the antenna elements are organized on a triangular lattice in the same shape as the power distribution 520. In the depicted embodiments, a first set of antenna elements that are in the center of the phased array antenna structure 500 are set to a first power level 501 of between approximately 0 dB and −2 dB, a second set antenna elements that are further out from the center of the phased array antenna structure 500 are set to a second power level 503 of between approximately −2 dB and −6 dB, and a third set antenna elements that are furthest from the center of the phased array antenna structure 500 are set to a third power level 505 of approximately −6 dB to −10 dB. Each antenna element in the first set is set to the first power level 501. Each antenna element in the second set is set to the second power level 503. Each antenna element in the third set is set to the third power level 505. In the depicted embodiment, there are 4992 antenna elements, and their respective power is tapered from the center to the edge in three steps.

Figure 5C:
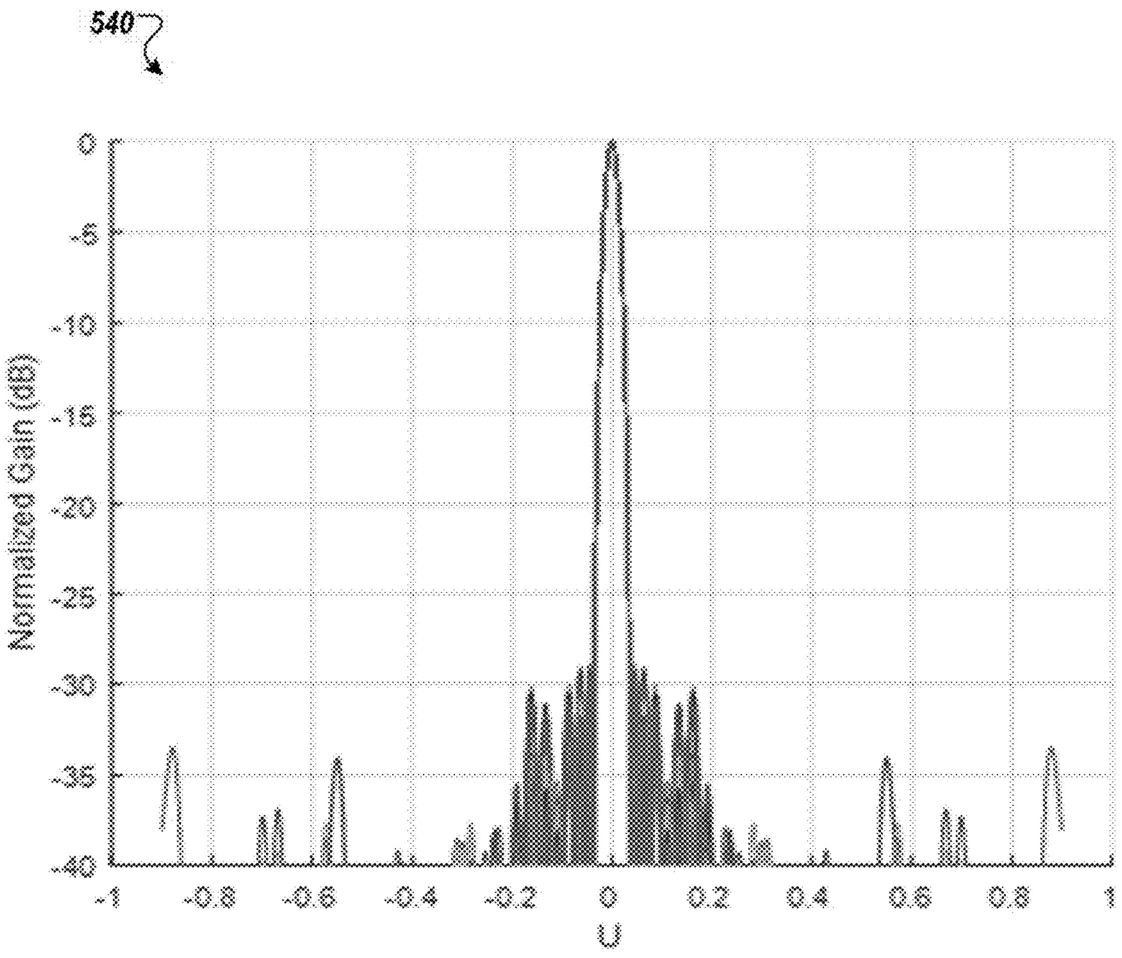
FIG. 5C is a graph of a normalized gain as a function of angle of a phased array antenna structure according to one embodiment.

FIG. 5C is a graph of a normalized gain 540 as a function of angle (U=sin(θ)) of a phased array antenna structure 500 according to one embodiment. Although not all components of the phased array antenna structure 500 are shown, the phased array antenna structure 500 is the same or similar to the phased array antenna structure 400 of FIG. 4C. In one embodiment, a normalized gain can be obtained by taking a Fourier transform of the power distribution 520 of FIG. 5B. The normalized gain 540 can be obtained by taking slices of the Fourier transform of the power distribution 520 and overlaying each slice. In the depicted embodiment, an array factor peak is 36.3 dBi and side lobes are optimized for −29 dBc. Further, a beam profile is maximal at approximately U=0 and there are grating lobes (e.g., side lobes) at U≈±0.2 and U≈±0.5 to ±0.9.

Figure 6A:
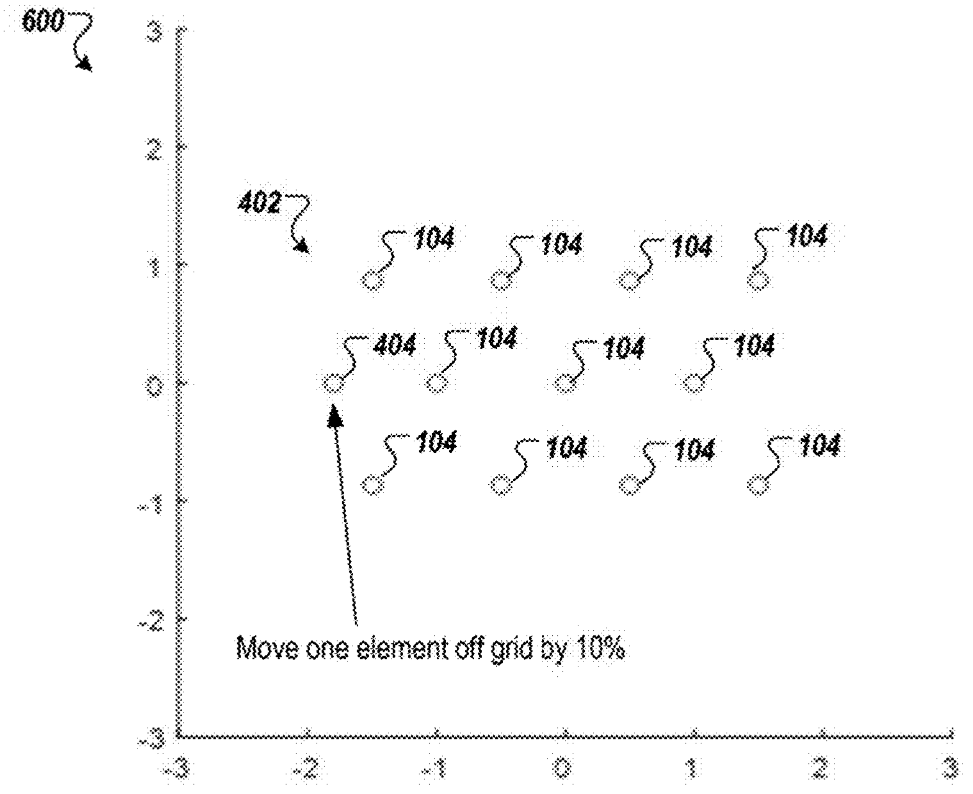
FIG. 6A is a schematic diagram of a triangular arrangement of antenna elements with one offset antenna element on an antenna module of a phased array antenna according to one embodiment.

FIG. 6A is a schematic diagram of a triangular arrangement of antenna elements 104 with one offset antenna element 404 on an antenna module 402 of a phased array antenna structure 600 according to one embodiment. Although not all components of the phased array antenna structure 600 are shown, the phased array antenna structure 600 is the same or similar to the phased array antenna structure 400 of FIG. 4C. The antenna module 402 and the antenna elements 404 are the same as the antenna modules 402 and the antenna elements 404 of FIGS. 4A-4C. The antenna elements 104 are the same as the antenna elements 104 of FIGS. 1A-1D. In the depicted embodiment, the offset distance (Δ) is ten percent (10%) of the first distance (d) (e.g., as described with respect to FIGS. 1A-1D). In other embodiments, the offset distance can be another percent of the first distance that does not result in two antenna elements overlapping.

Figure 6B:
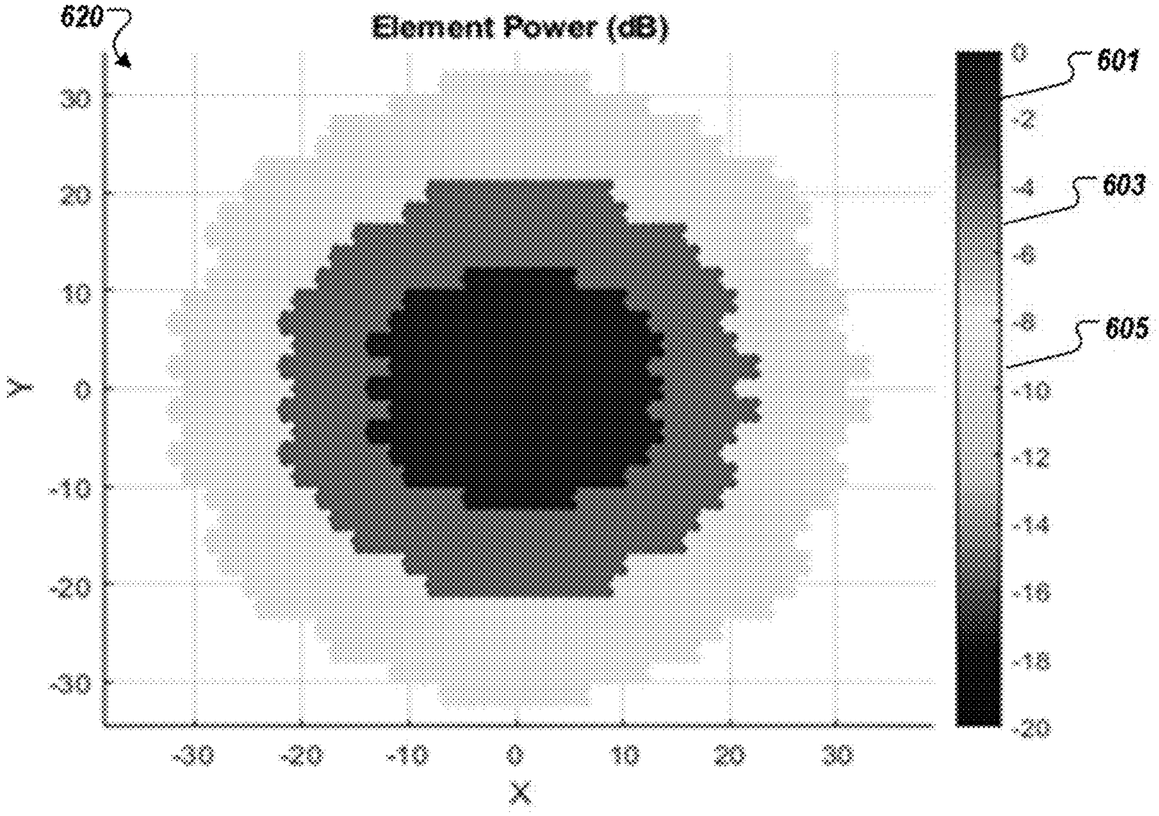
FIG. 6B is a graph of a power distribution of antenna elements of the phased array antenna structure according to one embodiment.

FIG. 6B is a graph of a power distribution 620 of antenna elements of the phased array antenna structure 600 according to one embodiment. Although not all components of the phased array antenna structure 600 are shown, the phased array antenna structure 600 is the same or similar to the phased array antenna structure 400 of FIG. 4C. The shape of the power distribution 620 represents the shape of the phased array antenna structure 400. In other words, antenna modules are arranged such that the antenna elements are organized on a triangular lattice in the same shape as the power distribution 620. In the depicted embodiments, a first set of antenna elements that are in the center of the phased array antenna structure 600 are set to a first power level 601 of between approximately 0 dB and −2 dB, a second set antenna elements that are further out from the center of the phased array antenna structure 500 are set to a second power level 603 of between approximately −2 dB and −6 dB, and a third set antenna elements that are furthest from the center of the phased array antenna structure 600 are set to a third power level 605 of approximately −6 dB to −10 dB. Each antenna element in the first set is set to the first power level 601. Each antenna element in the second set is set to the second power level 603. Each antenna element in the third set is set to the third power level 605. In the depicted embodiment, there are 4992 antenna elements, and their respective power is tapered from the center to the edge in three steps.

Figure 6C:
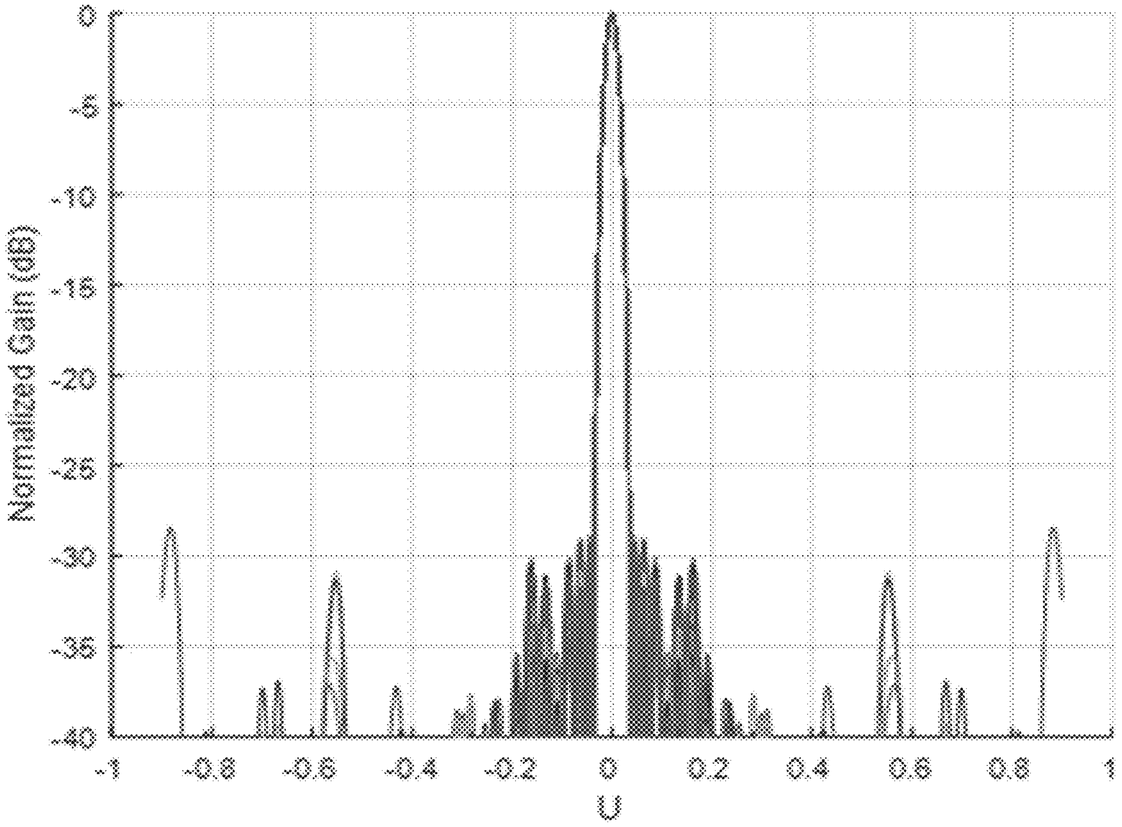
FIG. 6C is a graph of a normalized gain as a function of angle of a phased array antenna structure according to one embodiment.

FIG. 6C is a graph of a normalized gain 640 as a function of angle (U=sin(θ)) of a phased array antenna structure 600 according to one embodiment. Although not all components of the phased array antenna structure 600 are shown, the phased array antenna structure 600 is the same or similar to the phased array antenna structure 400 of FIG. 4C. In one embodiment, a normalized gain can be obtained by taking a Fourier transform of the power distribution 620 of FIG. 6B. The normalized gain 640 can be obtained by taking slices of the Fourier transform of the power distribution 620 and overlaying each slice. In the depicted embodiment, an array factor peak is 36.3 dBi and side lobes are optimized for −29 dBc. Further, a beam profile is maximal at approximately U=0 and there are grating lobes (e.g., side lobes) at U≈±0.2 and U≈±0.5 to ±1.

Figure 7A:
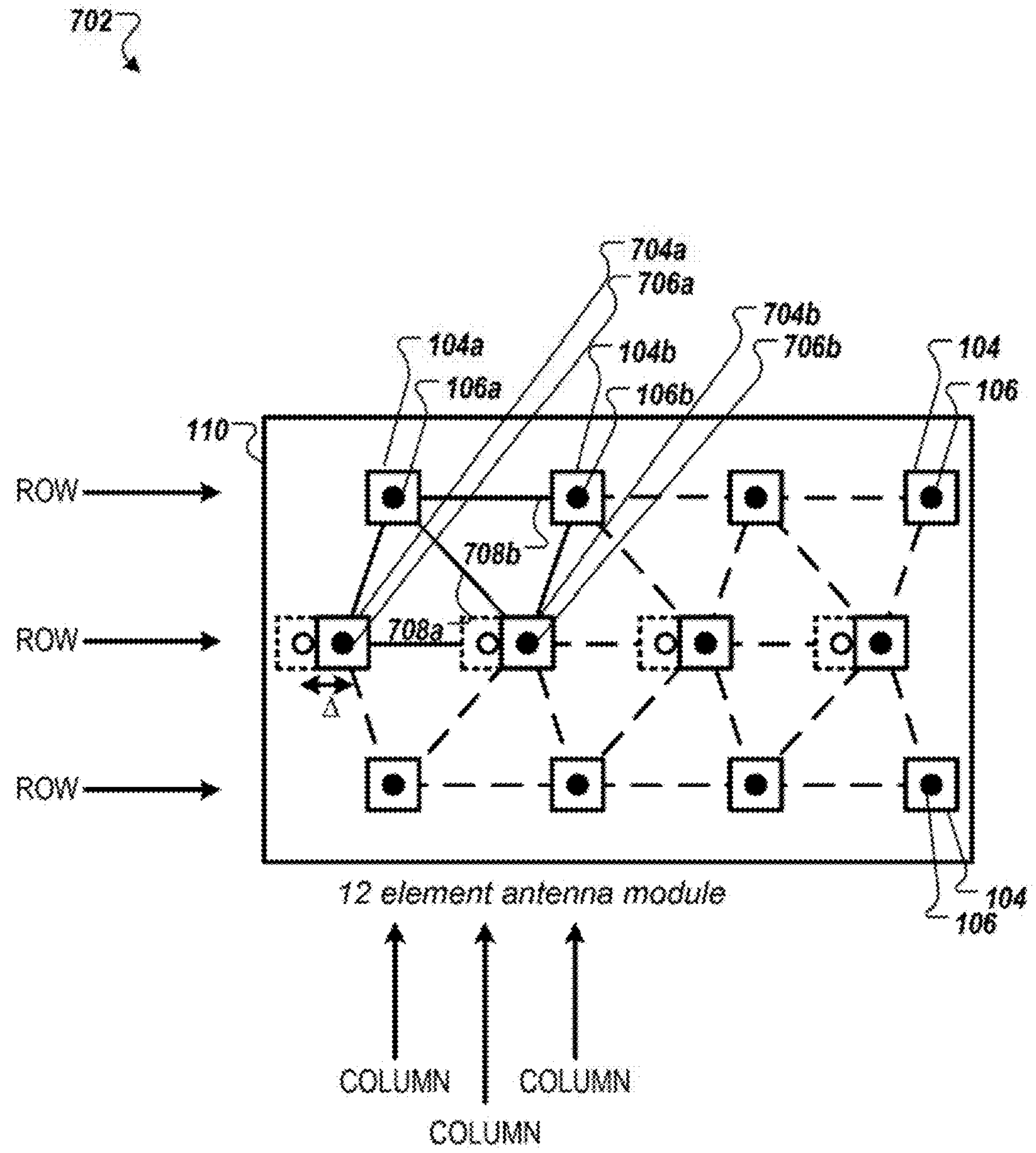
FIG. 7A is a schematic diagram of an antenna module with one row of shifted antenna elements of a phased array antenna structure according to one embodiment.

FIG. 7A is a schematic diagram of an antenna module 702 with one row of shifted antenna elements 704 of a phased array antenna structure according to one embodiment. The antenna module 702 is similar to the antenna module 102 of FIGS. 1A-1D except with one row of antenna elements 704 that is shifted off of the triangular arrangement (e.g., a row of feed points 706 of the antenna elements 704 is shifted to be off of the triangular lattice pattern). Each antenna element 104 and feed element 106 is the same as the antenna elements 104 and the feed elements 106 of FIGS. 1A-1D. Antenna elements 104 are separated by a first distance (d) from adjacent elements within the same row. Antenna elements 704 are separated by the first distance from adjacent antenna elements 704. The antenna elements 704 and the feed points 706 are identical to the antenna elements 104 and the feed points 106. In one embodiment, each feed point 106 of the antenna module 102 is located at a lattice point of an equilateral triangular lattice except a row of feed points 706 of antenna elements 704 that is offset from a corresponding lattice point by an offset distance (4). The offset distance is a percentage value of the first distance. The row of antenna elements 704 is adjacent to an edge 110 of the antenna module 702. A direction of the offset of antenna elements 704 can be in a direction along the row of antenna elements 704.

In one embodiment, the triangular arrangement of the antenna elements 104 is part of at least one of a rhombic lattice (e.g., an isosceles triangular lattice), a hexagonal lattice, an equilateral triangular lattice, or a parallelogrammic lattice (e.g., a scalene triangular lattice).

In one embodiment, the antenna elements 104 and the antenna elements 704 are organized as a first row, a second row, and a third row. The first row includes antenna elements 104. The second row includes antenna elements 704. The third row includes antenna elements 104. A first feed point 106*a* of a first antenna element 104*a* of the first row, a first feed point 706*a* of a first antenna element 704*a* of the second row, and a second feed point 706*b* of a second antenna element 704*b* of the second row are located to form a first scalene triangle 708*a*. The first antenna element 704*a* is separated from the second antenna element 704*b* by the first distance. The first antenna element 704*a* is separated from the first antenna element 104 by a second distance. The first antenna element 104*a* is separated from the second antenna element 704*b* by a third distance. The first distance, the second distance, and the third distance are all different. Further, the first feed point 106*a*, a second feed point 106*b* of a second antenna element 104*b* of the first row, and the second feed point 706*b* are located to form a second scalene triangle 708*b* with the same dimensions as, but inverted with respect to, the first scalene triangle 708*a*.

In one embodiment, feed points 106 of the antenna elements 104 are located at a lattice point in a triangular lattice. The triangular lattice includes a set of lattice points and three mutually adjacent lattice points form an equilateral triangle. The feed points 706 of the antenna elements 704 are arranged in a row that is offset from a corresponding row of lattice points that form an equilateral triangle with two mutually adjacent lattice points of the plurality of lattice points. The offset is a percentage value of the first distance. The row is shifted so as to increase a distance between the feed point 706*a* and the edge 110. In other words, a direction of the offset is along the shifted row.

Figure 7B:
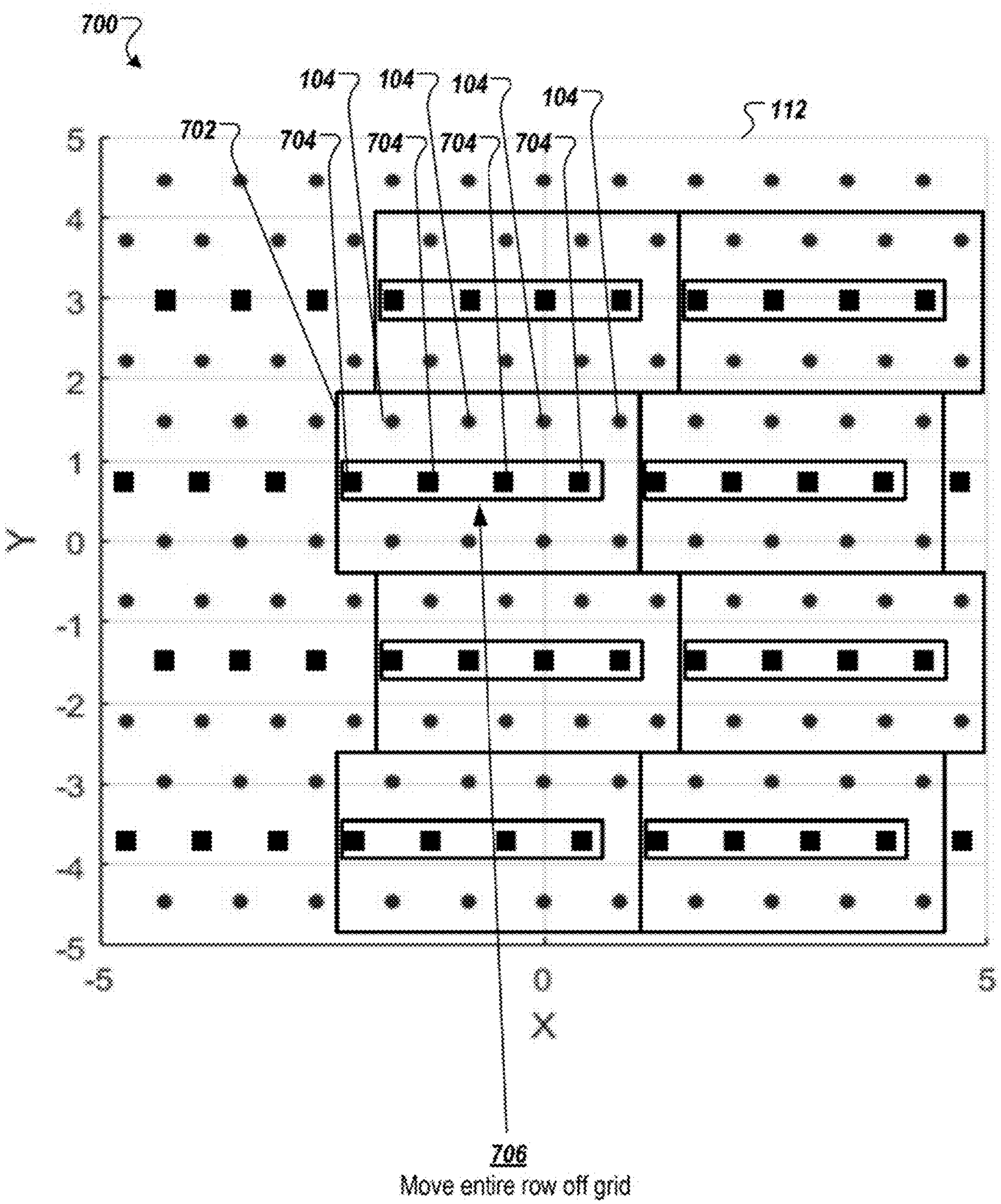
FIG. 7B is a schematic diagram of a phased array antenna structure constructed from antenna modules with one shifted row of antenna elements according to one embodiment.

FIG. 7B is a schematic diagram of a phased array antenna structure 700 constructed from antenna modules 702 with one shifted row of antenna elements 704 according to one embodiment. Although not all components of the antenna modules 702 are shown, the antenna modules 702 are the same or similar to the antenna modules 702 of FIG. 7A. In particular and for simplicity, the points represent the antenna elements 104 and 704, and the feed points 106 and 706 are not shown in FIG. 7B. The phased array antenna structure 700 includes a support structure 112. Sets of three adjacent antenna elements 104 are located to form an equilateral triangle with corresponding adjacent antenna elements 104. Sets of three adjacent antenna elements including one antenna element 104 and two antenna elements 704 are located to form a scalene triangle. Sets of adjacent antenna elements including two antenna elements 104 and one antenna element 704 are located to form a scalene triangle. The antenna elements 704 are represented as squares and the antenna elements 104 are represented as circles in FIG. 7B.

As depicted in FIG. 7B, each antenna module 702 of the phased array antenna structure 700 includes three rows and eight columns of antenna elements 104, and twelve total antenna elements (e.g., eight antenna elements 104 and four antenna elements 704). However, in other embodiments, antenna modules can have a different number of rows and columns of antenna elements as well as a different number of total antenna elements (e.g., a different number of antenna elements 104 and a different number of antenna elements 704).

In one embodiment, the phased array antenna structure 700 includes 4992 antenna elements and each antenna module 702 includes eight antenna elements 104 and four antenna elements 704, therefore the phased array antenna structure 700 includes 416 antenna modules 702. It should be noted that FIG. 7B does not show every antenna element of the phased array antenna structure 700.

In one embodiment, a RF module circuit is coupled to the phased array antenna, including the antenna modules 702, via RFFE circuitry. Alternatively, a microwave radio or other signal source can be coupled to the antenna modules 702. Each of the antenna modules 702 can be coupled physically to the support structure and electrically coupled to a communication system, such as RF radio or a microwave radio. The antenna modules 702 can be coupled to a circuit board or other types of support structures.

Figure 8A:
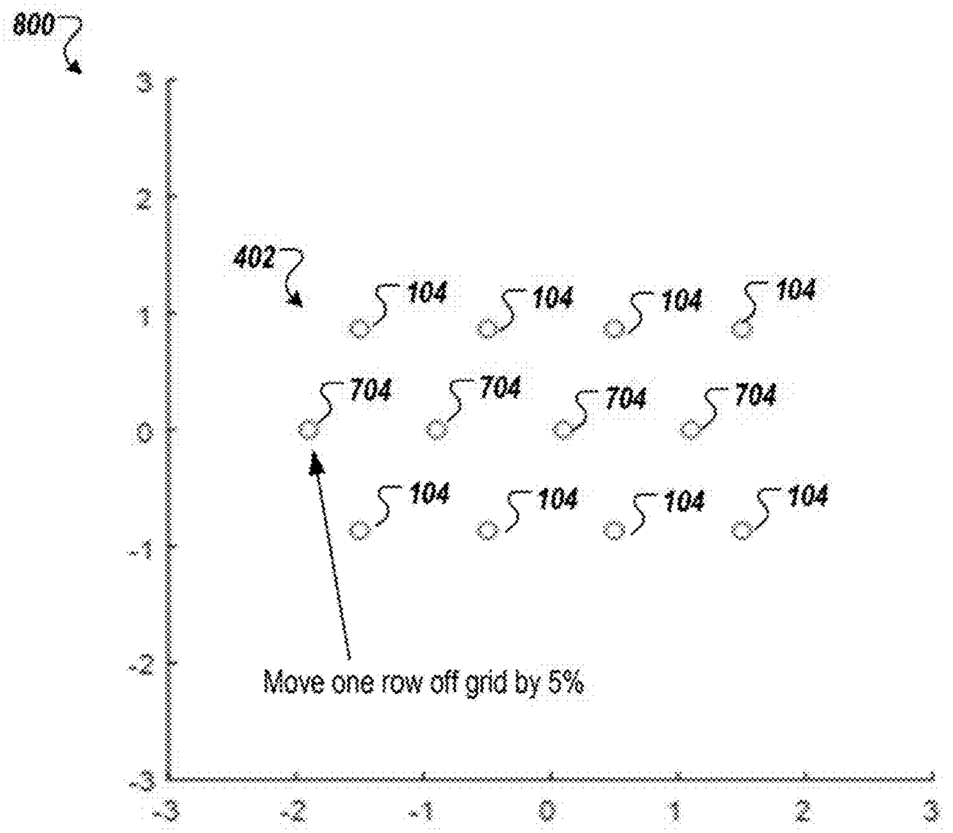
FIG. 8A is a schematic diagram of a triangular arrangement of antenna elements with one row offset antenna elements on an antenna module of a phased array antenna according to one embodiment.

FIG. 8A is a schematic diagram of a triangular arrangement of antenna elements 104 with one row offset antenna elements 704 on an antenna module 702 of a phased array antenna structure 800 according to one embodiment. Although not all components of the phased array antenna structure 800 are shown, the phased array antenna structure 800 is the same or similar to the phased array antenna structure 700 of FIG. 7B. The antenna module 702 and the antenna elements 704 are the same as the antenna modules 702 and the antenna elements 704 of FIGS. 7A-7B. The antenna elements 104 are the same as the antenna elements 104 of FIGS. 1A-1D. In the depicted embodiment, the offset distance (Δ) is five percent (5%) of the first distance (d) (e.g., as described with respect to FIGS. 1A-1D).

Figure 8B:
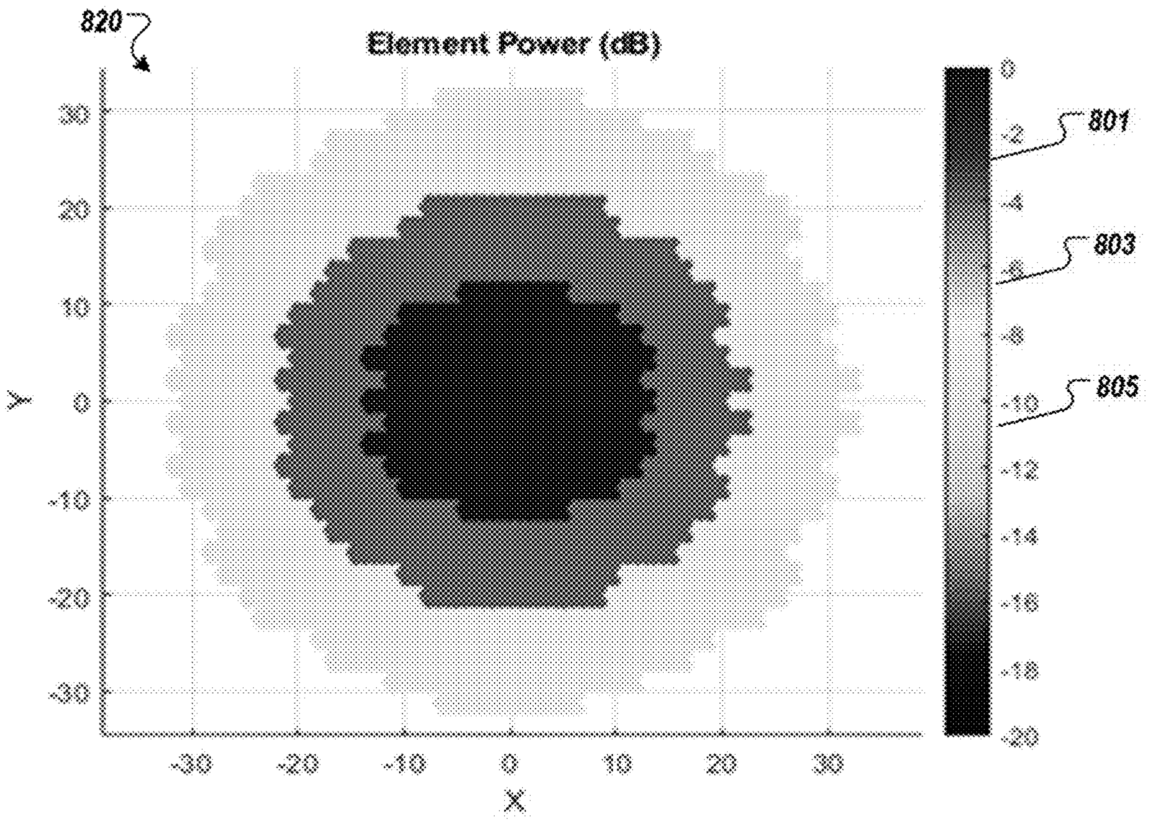
FIG. 8B is a graph of a power distribution of antenna elements of the phased array antenna structure according to one embodiment.

FIG. 8B is a graph of a power distribution 820 of antenna elements of the phased array antenna structure 800 according to one embodiment. Although not all components of the phased array antenna structure 800 are shown, the phased array antenna structure 800 is the same or similar to the phased array antenna structure 700 of FIG. 7B. The shape of the power distribution 820 represents the shape of the phased array antenna structure 800. In other words, antenna modules are arranged such that the antenna elements are organized on a triangular lattice in the same shape as the power distribution 820. In the depicted embodiments, a first set of antenna elements that are in the center of the phased array antenna structure 800 are set to a first power level 801 of between approximately 0 dB and −2 dB, a second set antenna elements that are further out from the center of the phased array antenna structure 800 are set to a second power level 803 of between approximately −2 dB and −6 dB, and a third set antenna elements that are furthest from the center of the phased array antenna structure 800 are set to a third power level 805 of approximately −6 dB to −10 dB. Each antenna element in the first set is set to the first power level 801. Each antenna element in the second set is set to the second power level 803. Each antenna element in the third set is set to the third power level 805. In the depicted embodiment, there are 4992 antenna elements, and their respective power is tapered from the center to the edge in three steps.

Figure 8C:
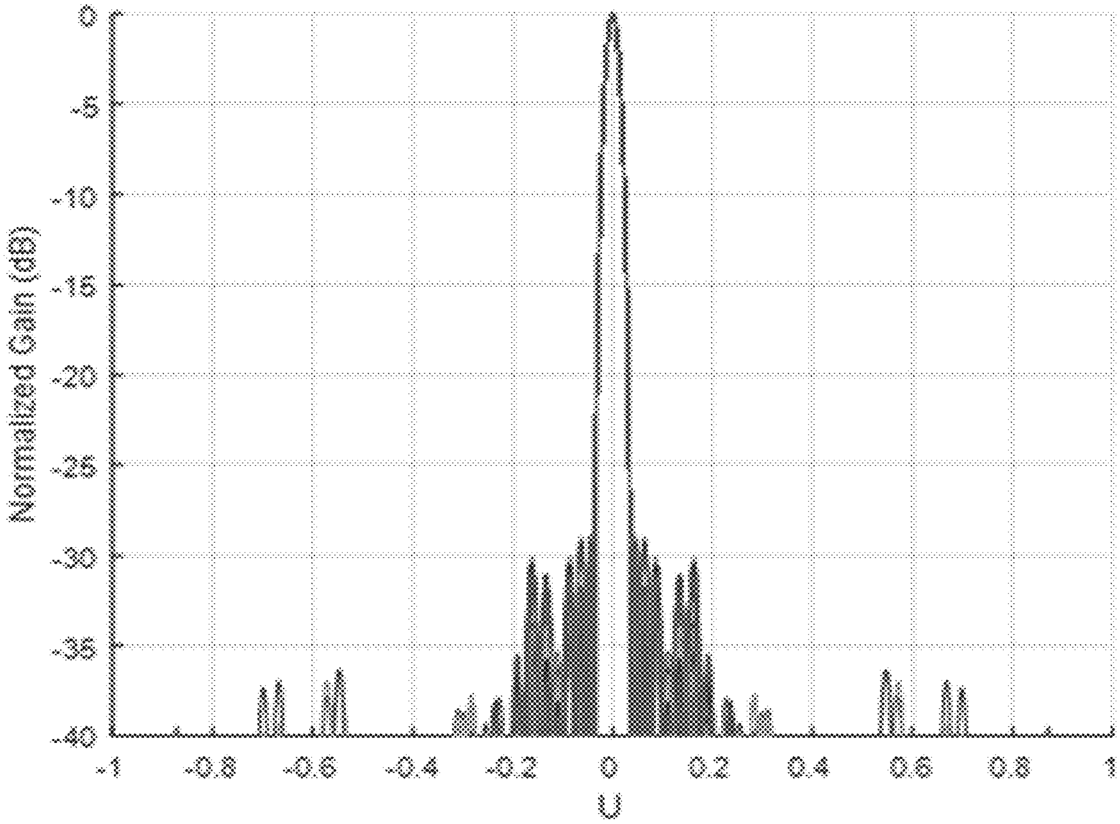
FIG. 8C is a graph of a normalized gain as a function of U of a phased array antenna structure according to one embodiment.

FIG. 8C is a graph of a normalized gain 840 as a function of angle ($U=\sin(\theta)$) of a phased array antenna structure 800 according to one embodiment. Although not all components of the phased array antenna structure 800 are shown, the phased array antenna structure 800 is the same or similar to the phased array antenna structure 700 of FIG. 7B. In one embodiment, a normalized gain can be obtained by taking a Fourier transform of the power distribution 820 of FIG. 8B. The normalized gain 840 can be obtained by taking slices of the Fourier transform of the power distribution 820 and overlaying each slice. In the depicted embodiment, an array factor peak is 36.3 dBi and side lobes are optimized for −29 dBc. Further, a beam profile is maximal at approximately $U=0$ and there are grating lobes (e.g., side lobes) at $U\approx\pm0.2$ and $U\approx\pm0.5$ to ±0.7.

Figure 9A:
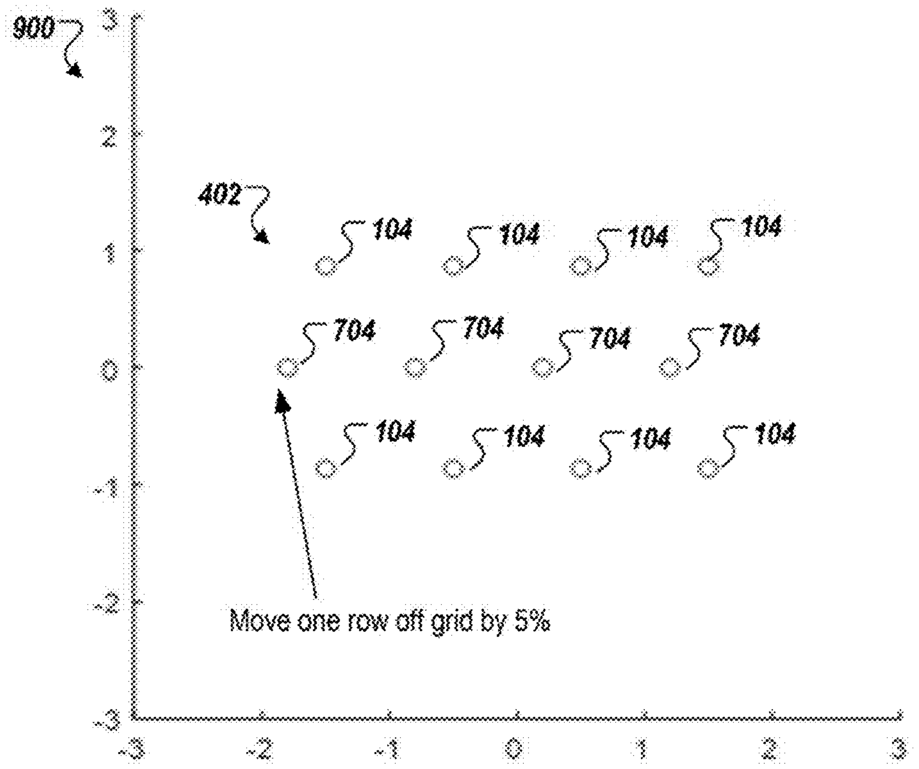
FIG. 9A is a schematic diagram of a triangular arrangement of antenna elements with one row offset antenna elements on an antenna module of a phased array antenna according to one embodiment.

FIG. 9A is a schematic diagram of a triangular arrangement of antenna elements 104 with one row offset antenna elements 704 on an antenna module 702 of a phased array antenna structure 900 according to one embodiment. Although not all components of the phased array antenna structure 800 are shown, the phased array antenna structure 900 is the same or similar to the phased array antenna structure 700 of FIG. 7B. The antenna module 702 and the antenna elements 704 are the same as the antenna modules 702 and the antenna elements 704 of FIGS. 7A-7B. The antenna elements 104 are the same as the antenna elements 104 of FIGS. 1A-1D. In the depicted embodiment, the offset distance (Δ) is ten percent (10%) of the first distance (d) (e.g., as described with respect to FIGS. 1A-1D). In other embodiments, the offset distance can be another percent of the first distance that does not result in two antenna elements overlapping. A direction of the offset of antenna elements 704 can be in a direction along the row of antenna elements 704.

Figure 9B:
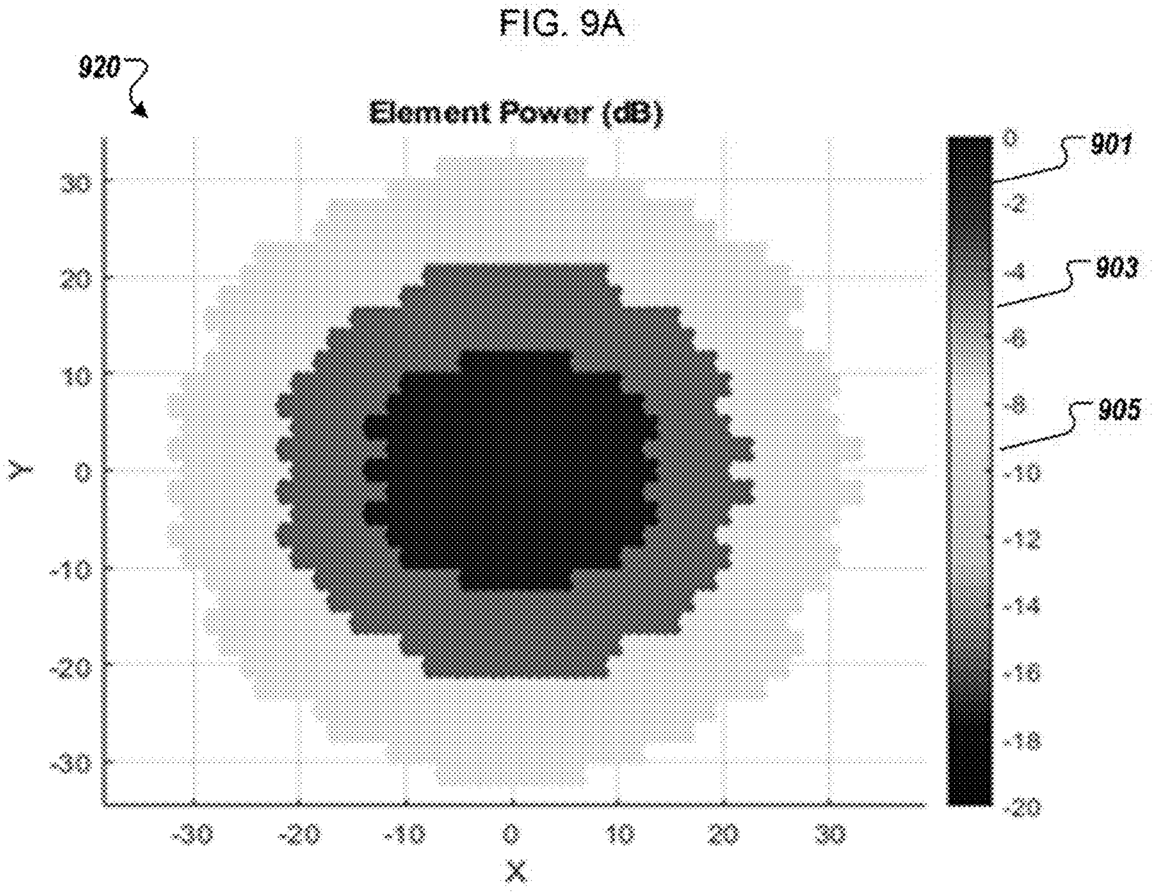
FIG. 9B is a graph of a power distribution of antenna elements of the phased array antenna structure according to one embodiment.

FIG. 9B is a graph of a power distribution 920 of antenna elements of the phased array antenna structure 900 according to one embodiment. Although not all components of the phased array antenna structure 900 are shown, the phased array antenna structure 900 is the same or similar to the phased array antenna structure 700 of FIG. 7B. The shape of the power distribution 920 represents the shape of the phased array antenna structure 900. In other words, antenna modules are arranged such that the antenna elements are organized on a triangular lattice in the same shape as the power distribution 920. In the depicted embodiments, a first set of antenna elements that are in the center of the phased array antenna structure 900 are set to a first power level 901 of between approximately 0 dB and −2 dB, a second set antenna elements that are further out from the center of the phased array antenna structure 900 are set to a second power level 903 of between approximately −2 dB and −6 dB, and a third set antenna elements that are furthest from the center of the phased array antenna structure 900 are set to a third power level 905 of approximately −6 dB to −10 dB. Each antenna element in the first set is set to the first power level 901. Each antenna element in the second set is set to the second power level 903. Each antenna element in the third set is set to the third power level 905. In the depicted embodiment, there are 4992 antenna elements, and their respective power is tapered from the center to the edge in three steps.

Figure 9C:
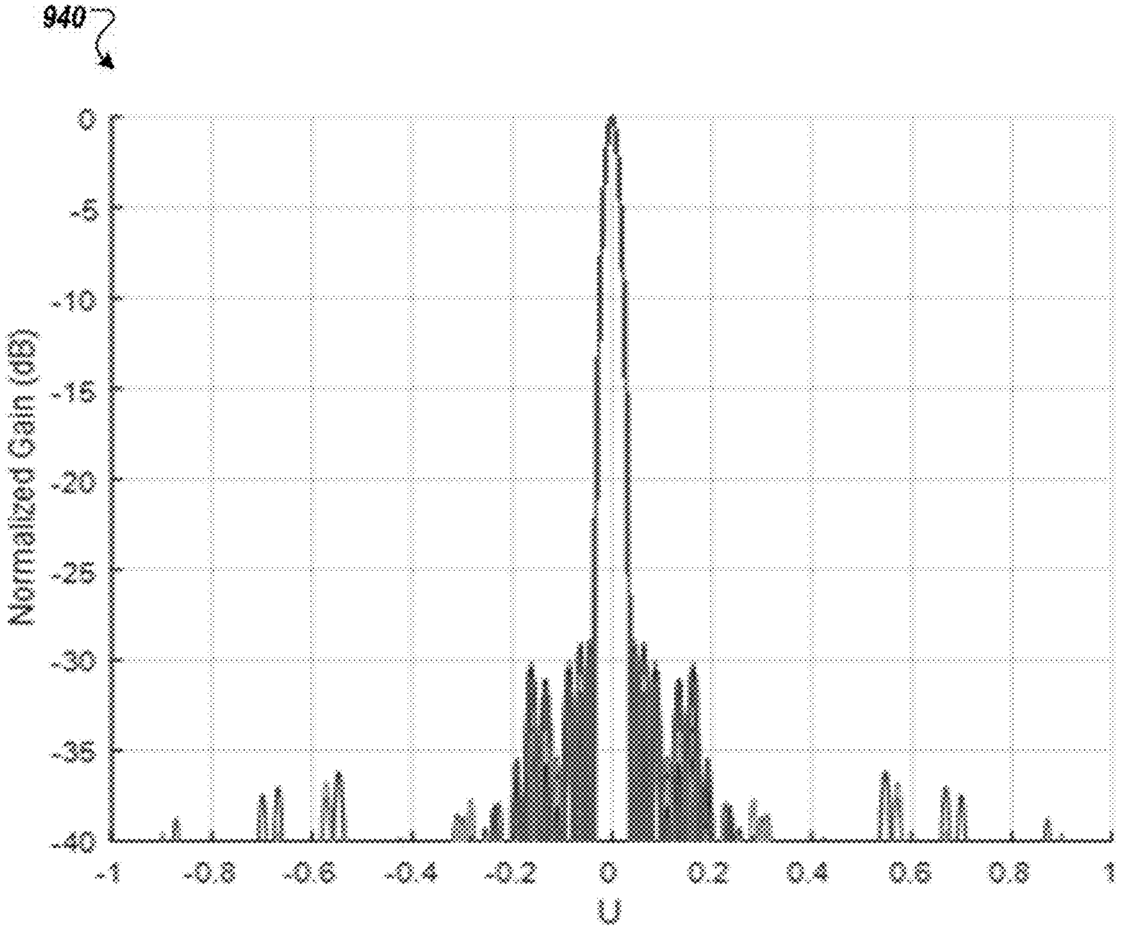
FIG. 9C is a graph of a normalized gain as a function of U of a phased array antenna structure according to one embodiment.

FIG. 9C is a graph of a normalized gain 940 as a function of angle (U=sin(θ)) of a phased array antenna structure 900 according to one embodiment. Although not all components of the phased array antenna structure 900 are shown, the phased array antenna structure 900 is the same or similar to the phased array antenna structure 700 of FIG. 7B. In one embodiment, a normalized gain can be obtained by taking a Fourier transform of the power distribution 920 of FIG. 9B. The normalized gain 940 can be obtained by taking slices of the Fourier transform of the power distribution 920 and overlaying each slice. In the depicted embodiment, an array factor peak is 36.3 dBi and side lobes are optimized for-29 dBc. Further, a beam profile is maximal at approximately U=0 and there are grating lobes (e.g., side lobes) at U≈±0.2 and U≈±0.5 to ±0.9.

Figure 10:
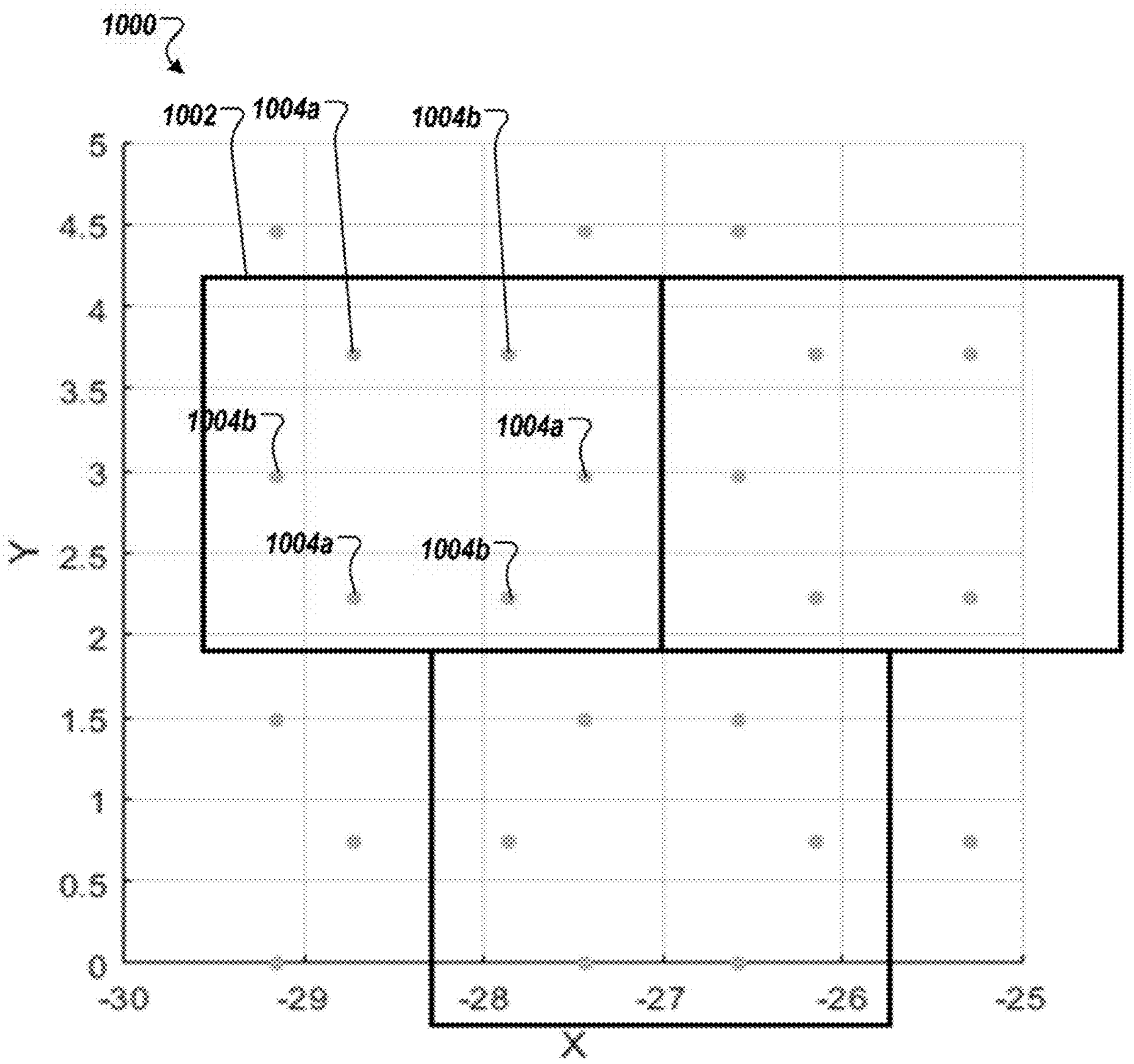
FIG. 10 is a schematic diagram of a phased array antenna structure with antenna elements on a honeycomb lattice pattern according to one embodiment.

FIG. 10 is a schematic diagram of a phased array antenna structure 1000 with antenna elements 1004 on a honeycomb lattice pattern according to one embodiment. The phased array antenna structure 1000 can be referred to as a thinned phased array antenna structure. The phased array antenna structure 1000 can be constructed with antenna modules 1002. In one embodiment, an antenna module 1002 includes six antenna elements 1004 arranged with a honeycomb pattern. The antenna elements are the same as the antenna elements 102 of FIGS. 1A-1D. In another embodiment, the antenna module 1002 includes three antenna elements 1004*a* arranged on a first equilateral triangular pattern and three antenna elements 1004*a* arranged on a second equilateral triangle pattern with the same dimensions but rotated with respect to the first equilateral triangular pattern. In another embodiment, the phased array antenna structure 1000 can be obtained by removing (e.g., intentionally removing) each antenna element of a triangular lattice that falls on an intersection of three antenna modules 1002 and each antenna element that falls at a center of each antenna module 1002.

In one embodiment, antenna elements that fall on an intersection of three antenna modules 1002 can be terminated with a matched load. In a further embodiment, antenna elements that fall in the center of each antenna module 1002 can be terminated with a matched load. A terminated element is an antenna element that is terminated to a matched load.

In one embodiment, antenna elements that would fall on an intersection of three antenna modules 1002 can be not printed at the time of manufacturing of the antenna modules. In a further embodiment, antenna elements that would fall in the center of each antenna module 1002 can be not printed at the time of manufacturing of the antenna modules.

Figure 11:
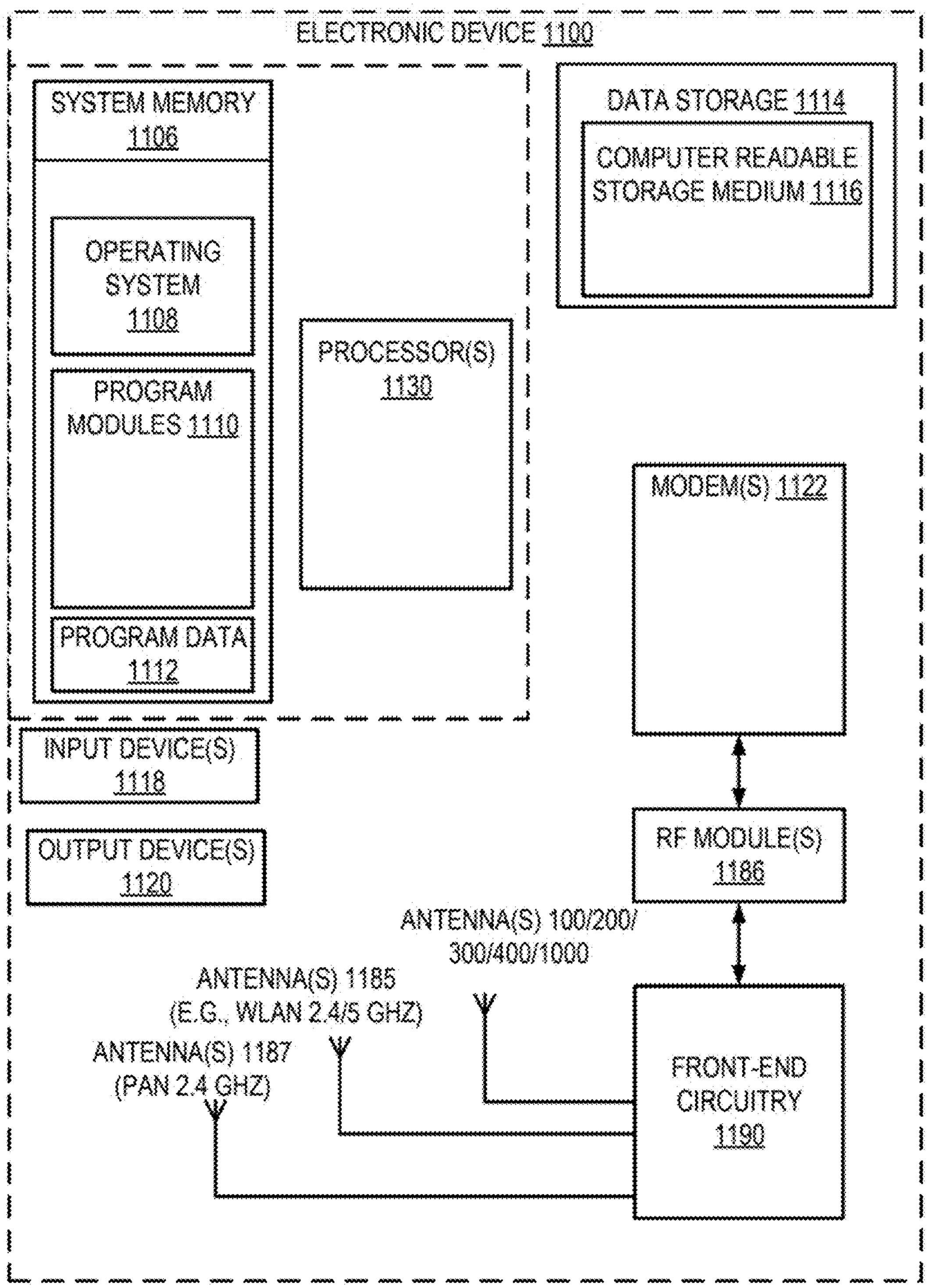
FIG. 11 is a block diagram of an electronic device that includes a phased array antenna structure with antenna elements on a triangular lattice on a rectangular antenna module as described herein according to one embodiment.

FIG. 11 is a block diagram of an electronic device 1100 that includes a phased array antenna structure with antenna elements on a triangular lattice on a rectangular antenna module as described herein according to one embodiment. In one embodiment, the electronic device 1100 includes the phased array antenna structure 100 of FIG. 1D. In another embodiment, the electronic device 1100 includes the phased array antenna structure 120 of FIG. 1E, the phased array antenna structure 130 of FIG. 1F, or the phased array antenna structure 140 of FIG. 1G. In another embodiment, the electronic device 1100 includes the phased array antenna structure 200 of FIG. 2. In another embodiment, the electronic device 1100 includes the phased array antenna structure 300 of FIG. 3. In another embodiment, the electronic device 1100 includes the phased array antenna structure 400 of FIG. 4C. In another embodiment, the electronic device 1100 includes the phased array antenna structure 500 of FIG. 5. In another embodiment, the electronic device 1100 includes the phased array antenna structure 600 of FIG. 6. In another embodiment, the electronic device 1100 includes the phased array antenna structure 700 of FIG. 7B. In another embodiment, the electronic device 1100 includes the phased array antenna structure 800 of FIG. 8. In another embodiment, the electronic device 1100 includes the phased array antenna structure 900 of FIG. 9. In another embodiment, the electronic device 1100 includes the phased array antenna structure 1000 of FIG. 10. Alternatively, the electronic device 1100 may be other electronic devices, as described herein.

The electronic device 1100 includes one or more processor(s) 1130, such as one or more CPUs, microcontrollers, field programmable gate arrays, or other types of processors. The electronic device 1100 also includes system memory 1106, which may correspond to any combination of volatile and/or non-volatile storage mechanisms. The system memory 1106 stores information that provides operating system component 1108, various program modules 1110, program data 1112, and/or other components. In one embodiment, the system memory 1106 stores instructions of methods to control operation of the electronic device 1100. The electronic device 1100 performs functions by using the processor(s) 1130 to execute instructions provided by the system memory 1106.

The electronic device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the electronic device 1100, the system memory 1106 and the processor(s) 1130 also constituting computer-readable media. The electronic device 1100 may also include one or more input devices 1118 (keyboard, mouse device, specialized selection keys, etc.) and one or more output devices 1120 (displays, printers, audio output mechanisms, etc.).

The electronic device 1100 further includes a modem 1122 to allow the electronic device 1100 to communicate via a wireless connections (e.g., such as provided by the wireless communication system) with other computing devices, such as remote computers, an item providing system, and so forth. The modem 1122 can be connected to one or more radio frequency (RF) modules 1186. The RF modules 1186 may be a wireless local area network (WLAN) module, a wide area network (WAN) module, wireless personal area network (WPAN) module, Global Positioning System (GPS) module, or the like. The antenna structures (antenna(s) 100/120/130/140/200/300/400/600/600/700/800/900/1000, 1185, 1187) are coupled to the front-end circuitry 1190, which is coupled to the modem 1122. The front-end circuitry 1190 may include radio front-end circuitry, antenna switching circuitry, impedance matching circuitry, or the like. The antennas 100/120/130/140/200/300/400/600/600/700/800/900/1000 may be GPS antennas, Near-Field Communication (NFC) antennas, other WAN antennas, WLAN or PAN antennas, or the like. The modem 1122 allows the electronic device 1100 to handle both voice and non-voice communications (such as communications for text messages, multimedia messages, media downloads, web browsing, etc.) with a wireless communication system. The modem 1122 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 1122 may generate signals and send these signals to antenna(s) 100/120/130/140/200/300/400/600/600/700/800/900/1000 of a first type (e.g., WLAN 5 GHZ), antenna(s) 1185 of a second type (e.g., WLAN 2.4 GHZ), and/or antenna(s) 1187 of a third type (e.g., WAN), via front-end circuitry 1190, and RF module(s) 1186 as descried herein. Antennas 100/120/130/140/200/300/400/600/600/700/800/900/1000, 1185, 1187 may be configured to transmit in different frequency bands and/or using different wireless communication protocols. The antennas 100/120/130/140/200/300/400/600/600/700/800/900/1000, 1185, 1187 may be directional, omnidirectional, or non-directional antennas. In addition to sending data, antennas 100/200/250/300/400/1000, 1185, 1187 may also receive data, which is sent to appropriate RF modules connected to the antennas. One of the antennas 100/120/130/140/200/300/400/600/600/700/800/900/1000, 1185, 1187 may be any combination of the antenna structures described herein.

In one embodiment, the electronic device 1100 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 1122 is shown to control transmission and reception via antenna (100/120/130/140/200/300/400/600/600/700/800/900/1000, 1185, 1187), the electronic device 1100 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:

a radio frequency (RF) module circuit;

radio frequency front-end (RFFE) circuitry coupled to the RF module circuit;

a support structure; and an antenna array coupled to the RFFE circuitry, the antenna array comprising a plurality of antenna modules coupled to the support structure, wherein each antenna module of the plurality of antenna modules has a rectangular shape and comprises a first plurality of antenna elements that are disposed in a triangular arrangement, wherein:

a first antenna element from a first antenna module of the plurality of antenna modules and a second antenna element from a second antenna module of the plurality of antenna modules are separated by a first distance;

each antenna element of the first plurality of antenna elements has a size that is less than half of the first distance;

the first antenna element is located at a first vertex of an equilateral triangle; and the second antenna element is located at a point that is offset from a second vertex of the equilateral triangle.

2. The wireless device of claim 1, wherein each feed point of the first plurality of antenna elements is located at a point of a lattice, wherein the lattice is at least one of a rhombic lattice, a hexagonal lattice, a triangular lattice, or a parallelogrammic lattice.

3. The wireless device of claim 1, further comprising a feed point for each antenna element of the first plurality of antenna elements is located at a lattice point in a triangular lattice comprising a plurality of lattice points, wherein:

three mutually adjacent lattice points, of the plurality of lattice points, form the equilateral triangle; and a first feed point for the second antenna element is offset from a corresponding lattice point that forms the equilateral triangle with two mutually adjacent lattice points of the plurality of lattice points.

4. The wireless device of claim 3, wherein the second antenna element is adjacent to an edge of the respective antenna module.

5. The wireless device of claim 1, further comprising a feed point for each antenna element of the first plurality of antenna elements, wherein:

a first feed point for the first antenna element is located at the first vertex of the equilateral triangle;

a second feed point for the second antenna element is located at the point that is offset from the second vertex of the equilateral triangle; and a third feed point for a third antenna element, of the first plurality of antenna elements, is located at a second point that is offset from a third vertex of the equilateral triangle.

6. The wireless device of claim 1, wherein:

the first plurality of antenna elements are arranged in a plurality of rows;

the first antenna element is part of a first row of the plurality of rows, and the second antenna element is part of a second row of the plurality of rows;

the first antenna element, the second antenna element, and a third antenna element form the triangular arrangement; and the third antenna element is located at a third vertex of the equilateral triangle.

7. The wireless device of claim 1, wherein:

the first plurality of antenna elements are arranged in a plurality of rows;

the first antenna element is part of a first row of the plurality of rows, and the second antenna element is part of a second row of the plurality of rows;

the first antenna element, the second antenna element, and a third antenna element form the triangular arrangement; and the third antenna element is located at a point that is offset from a third vertex of the equilateral triangle.

8. The wireless device of claim 1, wherein the second antenna module has a rectangular shape and comprises a second plurality of antenna elements arranged in rows, wherein the first antenna element of the first plurality of antenna elements and a second antenna element of the second plurality of antenna elements are separated by at least the first distance, wherein each antenna element of the second plurality of antenna elements has the size.

9. The wireless device of claim 1, wherein the first plurality of antenna elements are organized in a grid of multiple rows and multiple columns, wherein at least one of the multiple rows is offset from at least two of the other rows of the multiple rows by less than 25 percent of the first distance in a longitudinal axis of the at least one of the multiple rows.

10. The wireless device of claim 1, wherein:

the first plurality of antenna elements are organized as a first row, a second row, and a third row of antenna elements; and the second row of antenna elements is offset from the first row and the third row along a longitudinal axis of the second row such that i) a first feed point of a first antenna element of the first row, a second feed point of a second antenna element of the second row, and a third feed point of a third antenna element of the second row form a first non-equilateral triangle; and ii) the third feed point, a fourth feed point of a fourth antenna element of the third row, and a fifth feed point of a fifth antenna element of the third row form a second non-equilateral triangle.

11. The wireless device of claim 1, wherein:

the second antenna module has a rectangular shape and comprises a second plurality of antenna elements that are disposed in a triangular arrangement;

two adjacent antenna elements of the second plurality of antenna elements are separated by the first distance, each antenna element of the second plurality of antenna elements having the size; and the first antenna element of the first plurality of antenna elements and a second antenna element of the second plurality of antenna elements are separated by at least the first distance.

12. A wireless device comprising:

a radio frequency (RF) module circuit;

radio frequency front-end (RFFE) circuitry coupled to the RF module circuit; and an antenna array comprising:

a circuit board; and a first antenna module coupled to the circuit board, the first antenna module having a rectangular shape and comprising a first plurality of antenna elements arranged as a first row and a second row within the rectangular shape, wherein an antenna element of the first row and two antenna elements of the second row form a triangular pattern, wherein two adjacent antenna elements of the first plurality of antenna elements are separated by a first distance, and wherein each antenna element of the first plurality of antenna elements has a first size that is less than half the first distance, wherein:

the antenna element is located at a first vertex of an equilateral triangle, a first antenna element of the two antenna elements is located at a point that is offset from a second vertex of the equilateral triangle, and a second antenna element of the two antenna elements is located at a third vertex of the equilateral triangle.

13. The wireless device of claim 12, further comprising:

a second antenna module coupled to the circuit board, the second antenna module having a rectangular shape and comprising a second plurality of antenna elements arranged in rows, wherein a first antenna element of the first plurality of antenna elements and a second antenna element of the second plurality of antenna elements are separated by at least the first distance, wherein each antenna element of the second plurality of antenna elements has the first size.

14. The wireless device of claim 12, further comprising:

a feed point for each antenna element of the first plurality of antenna elements is located at a lattice point in a lattice, the lattice comprising a plurality of lattice points, wherein the lattice is at least one of a rhombic lattice, a hexagonal lattice, a triangular lattice, or a parallelogrammic lattice.

15. The wireless device of claim 12, further comprising a feed point for each antenna element of the first plurality of antenna elements is located at a lattice point in a triangular lattice comprising a plurality of lattice points, wherein:

three mutually adjacent lattice points, of the plurality of lattice points, form the equilateral triangle; and a first feed point for the second antenna element is offset from a corresponding lattice point that forms the equilateral triangle with two mutually adjacent lattice points of the plurality of lattice points.

16. The wireless device of claim 12, wherein the first antenna element is adjacent to an edge of the first antenna module.

17. A wireless device comprising:

a radio frequency (RF) module circuit;

radio frequency front-end (RFFE) circuitry coupled to the RF module circuit;

a support structure;

a first antenna module coupled to the support structure, the first antenna module having a rectangular shape and comprising a first plurality of antenna elements arranged as a first row and a second row within the rectangular shape, wherein an antenna element of the first row and two antenna elements of the second row form a triangular pattern, wherein two adjacent antenna elements of the first plurality of antenna elements are separated by a first distance, and wherein each antenna element of the first plurality of antenna elements has a first size that is less than half the first distance;

a first feed point for the antenna element of the first row, wherein the first feed point is located at a first vertex of an equilateral triangle; and a second feed point for one of the two antenna elements of the second row, wherein the second feed point is located at a point that is offset from a second vertex of the equilateral triangle.

18. The wireless device of claim 17, further comprising:

a third feed point for a third antenna element of the first plurality of antenna elements, wherein the third feed point is located a second point that is offset from a third vertex of the equilateral triangle.

19. The wireless device of claim 17, further comprising:

a second antenna module coupled to the support structure, the second antenna module having a rectangular shape and comprising a second plurality of antenna elements arranged in rows, wherein a first antenna element of the first plurality of antenna elements and a second antenna element of the second plurality of antenna elements are separated by at least the first distance, wherein each antenna element of the second plurality of antenna elements has the first size.

20. The wireless device of claim 17, further comprising:

a plurality of feed points comprising the first feed point and the second feed point, wherein each feed point of the plurality of feed points is located at a lattice point in a lattice, wherein the lattice is at least one of a rhombic lattice, a hexagonal lattice, a triangular lattice, or a parallelogrammic lattice.

* * * * *